(12) United States Patent
Graf et al.

(10) Patent No.: US 8,924,949 B2
(45) Date of Patent: *Dec. 30, 2014

(54) SYNCHRONIZATION MODULES FOR PERFORMING SYNCHRONIZATION OF PROGRAMMABLE HARDWARE ELEMENTS

(71) Applicant: National Instruments Corporation, Austin, TX (US)

(72) Inventors: Christopher F. Graf, Liberty Hill, TX (US); Ryan H. Brown, Austin, TX (US); Daniel J. Baker, Cary, NC (US); Matthew J. DeVoe, Austin, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/304,412

(22) Filed: Jun. 13, 2014

(65) Prior Publication Data

US 2014/0298289 A1    Oct. 2, 2014

Related U.S. Application Data

(63) Continuation of application No. 13/527,208, filed on Jun. 19, 2012, now Pat. No. 8,756,565.

(60) Provisional application No. 61/600,346, filed on Feb. 17, 2012.

(51) Int. Cl.
*G06F 9/44* (2006.01)

(52) U.S. Cl.
CPC ........................................ *G06F 8/34* (2013.01)
USPC ........... 717/168; 717/104; 717/106; 717/110; 717/169; 707/610; 707/611

(58) Field of Classification Search
None
See application file for complete search history.

(56) References Cited

U.S. PATENT DOCUMENTS

| | | | |
|---|---|---|---|
| 4,980,577 A | 12/1990 | Baxter | |
| 5,450,458 A | 9/1995 | Price et al. | |
| 5,481,741 A | 1/1996 | McKaskle et al. | |
| 5,544,179 A * | 8/1996 | Hartwell | 714/798 |
| 5,598,566 A * | 1/1997 | Pascucci et al. | 713/324 |
| 5,603,043 A | 2/1997 | Taylor et al. | |
| 5,682,535 A * | 10/1997 | Knudsen | 717/117 |
| 5,710,783 A * | 1/1998 | Luthi et al. | 714/755 |
| 5,717,704 A | 2/1998 | Rosenfeld | |
| 5,969,631 A | 10/1999 | Ammler et al. | |
| 6,073,160 A | 6/2000 | Grantham et al. | |
| 6,081,533 A | 6/2000 | Laubach et al. | |
| 6,127,976 A | 10/2000 | Boyd et al. | |

(Continued)

*Primary Examiner* — Chameli Das

(74) *Attorney, Agent, or Firm* — Meyertons Hood Kivlin Kowert & Goetzel, P.C.; Jeffrey C. Hood; Mark S. Williams

(57) ABSTRACT

Customizing a target system. The target system may include a first device with a first programmable hardware element (PHE) and a second device with a second PHE. Synchronization modules may be provided for implementation on the first and second PHEs. The synchronization modules may provide a standard interface for interacting with other code. A user may specify user-created code for the first and second PHEs which utilizes the synchronization modules. The user-created code may interact with the synchronization modules using the standard interface. Accordingly, hardware descriptions may be generated for the first and second PHEs of the target system. Different modules may be used for different interconnects. Additionally, multiple synchronization modules may be used, e.g., dynamically, during operation of the target system.

17 Claims, 32 Drawing Sheets

(56) References Cited

U.S. PATENT DOCUMENTS

| | | |
|---|---|---|
| 6,163,583 A | 12/2000 | Lin et al. |
| 6,219,153 B1 | 4/2001 | Kawanabe et al. |
| 6,219,628 B1 | 4/2001 | Kodosky et al. |
| 6,297,760 B1 | 10/2001 | Hungerbuehler et al. |
| 6,584,601 B1 | 6/2003 | Kodosky et al. |
| 6,823,283 B2 | 11/2004 | Steger et al. |
| 6,934,667 B2 | 8/2005 | Kodosky et al. |
| 7,024,660 B2 | 4/2006 | Andrade et al. |
| 7,085,670 B2 | 8/2006 | Odom et al. |
| 7,114,091 B2 | 9/2006 | Vrancic |
| 7,152,027 B2 | 12/2006 | Andrade et al. |
| 7,165,005 B2 | 1/2007 | Steger et al. |
| 7,240,231 B2 | 7/2007 | Conway |
| 7,478,349 B2 | 1/2009 | Hayles et al. |
| 7,509,445 B2 | 3/2009 | Odom et al. |
| 7,512,725 B2 | 3/2009 | Odom et al. |
| 7,542,867 B2 | 6/2009 | Steger et al. |
| 7,865,326 B2 | 1/2011 | Johnson et al. |
| 2001/0011313 A1 | 8/2001 | Hungerbuehler et al. |
| 2002/0124241 A1* | 9/2002 | Grey et al. .................. 717/149 |
| 2005/0137653 A1 | 6/2005 | Friedman et al. |
| 2006/0010199 A1 | 1/2006 | Brailean et al. |
| 2006/0041859 A1* | 2/2006 | Vrancic et al. .............. 717/105 |
| 2006/0053211 A1* | 3/2006 | Kornerup et al. ........... 709/217 |
| 2006/0150149 A1* | 7/2006 | Chandhoke et al. ........ 717/109 |
| 2006/0184335 A1 | 8/2006 | Odom |
| 2006/0190209 A1 | 8/2006 | Odom |
| 2013/0007698 A1* | 1/2013 | Warila et al. ................ 717/106 |
| 2013/0212556 A1* | 8/2013 | Heyhoe et al. .............. 717/106 |

* cited by examiner

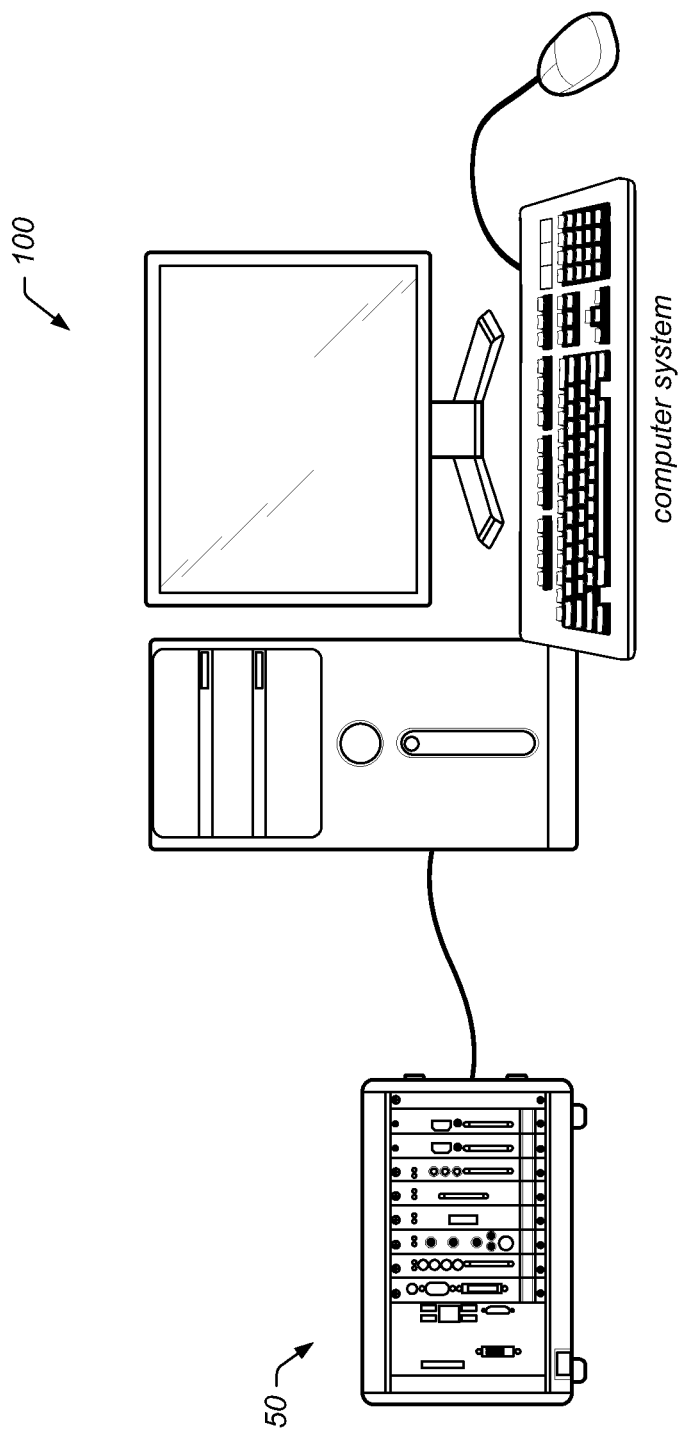

SYNCHRONIZATION MODULES FOR PERFORMING SYNCHRONIZATION OF PROGRAMMABLE HARDWARE ELEMENTS

CONTINUATION AND PRIORITY DATA

This application is a Continuation of U.S. application Ser. No. 13/527,208, titled "Modifying a Target System Configuration to Utilize a Different Synchronization Module for Performing Synchronization among Multiple Programmable Hardware Elements", filed Jun. 19, 2012, whose inventors were Christopher F. Graf, Ryan H. Brown, Daniel J. Baker, and Matthew J. DeVoe, which claims benefit of priority of U.S. provisional application Ser. No. 61/600,346 titled "Customizing Synchronization of Custom Code among Multiple Programmable Hardware Elements within a System" filed Feb. 17, 2012, whose inventors were Christopher F. Graf, Ryan H. Brown, Daniel J. Baker, Matthew J. DeVoe, and Sarvesh V. Nagarajan, both of which are hereby incorporated by reference in their entirety as though fully and completely set forth herein.

FIELD OF THE INVENTION

The present invention relates to synchronization, and more particularly to a system and method for customizing synchronization of custom code among a plurality of programmable hardware elements within a system.

DESCRIPTION OF THE RELATED ART

Users, e.g., system designers, often desire to synchronize operations of devices within target systems. For example, a system designer may wish for individual devices (e.g., custom code implemented on programmable hardware elements of the devices) within a test instrument to synchronize operations in order to test devices under test (DUTs) or systems under test (SUTs). Similarly, a user may wish to synchronize operations of devices in a plethora of other systems or environments.

However, in order to perform synchronization, a system designer may be forced to program the synchronization procedure de novo or use fixed, built in synchronization solutions that may not be flexible. More specifically, using test instrument configuration as an example, users were forced to either use configurations and code that were essentially fixed, as shown in FIG. 1, or were required to create custom code for the entire system, as shown in FIG. 2. Neither of these models provides an efficient solution for these users.

Accordingly, improvements in implementing synchronization in systems are desired.

SUMMARY OF THE INVENTION

Various embodiments for configuring and performing synchronization in a target system are presented.

The target system may include a first device with a first programmable hardware element (PHE) and a second device with a second PHE. In one embodiment, the target system may be a test instrument which is configured to test a system under test (SUT). For example, the test instrument may include measurement devices (e.g., each having PHEs) for performing the testing of the SUT.

Synchronization modules may be provided to configure synchronization between the two devices of the target system. The synchronization modules may include code for implementation on the PHEs of the devices. Additionally, the synchronization modules may provide a standard interface for interacting with other code, such as user-created code or other types of modules. For example, the synchronization modules may use a standard API (application programming interface) for performing synchronization functions for other code. In one embodiment, a first synchronization module may be used for the first device (e.g., the first PHE) and a second synchronization module may be used for the second device (e.g., the second PHE).

User input may be received associating code with the synchronization modules. For example, a user may specify custom code which implements desired functionality of the target system. By associating the code with the synchronization modules, the user may synchronize operation of the two devices, e.g., operation of the custom code implemented on the two devices, by using the synchronization modules. For example, the user may specify that the custom code of the first device uses a first synchronization module that is targeted for the first device. Similarly, the user may specify that the custom code for the second device uses a second synchronization module that is targeted for the second device. More specifically, the user may specify code for the first device (e.g., for implementation on the first PHE) as well as code for the second device (e.g., for implementation on the second PHE).

The code may be specified in any of a variety of manners. For example, the user may specify the code in a graphical program. Accordingly, the user may connect (e.g., via wires) node(s) of the custom code with the synchronization module(s) to perform the association. As indicated above, the synchronization modules may use a common interface so that the same connections in the graphical program could be used for any of a variety of synchronization modules. Alternatively, or additionally, the user may specify the code via text and may associate the code by using API calls or functions that are supported by the API of the synchronization modules.

Note that there may be multiple synchronization modules, e.g., for different types of synchronizations, different interconnects (e.g., Ethernet, wireless, simple digital interface, optical link, etc.), etc. However, each of these synchronization modules may use or present the same interface, and may thus allow for interchangeability, e.g., without any modification of code that interacts with the synchronization modules. Accordingly, the user may initially use synchronization module(s) that are associated with a first type of interconnect, but may modify the configuration or program to use a second type of interconnect. Thus, the user may modify the configuration to use a second synchronization module that is associated with the second type of interconnect, but without being required to modify his code, e.g., because of the standard interface. Alternatively, the second synchronization module may be automatically selected or used in response to selection or detection of the second type of interconnect.

In further embodiments, a plurality of different synchronization modules may be selected for the target system. For example, these different synchronization modules may perform synchronization in different manners, using different interconnects (e.g., where more than one is available), etc. Additionally, the user may provide input creating selection code that dynamically selects one of the synchronization modules based on run-time operation of the target system. For example, the selection code may be configured to detect a current configuration and automatically select the appropriate synchronization module based on the detected configuration. As another example, the selection code may be configured to perform tests of the different synchronization modules and select the best or most effective synchronization method, e.g., based on user specified criteria. In even further embodiments, the user may not need to specify the selection code and this process may be performed automatically, e.g., based on synchronization modules selected by the user.

Based on the user specified code and the synchronization modules described above (among other possible code or modules), a first hardware description may be generated for implementation by the first PHE. Similarly, a second hardware description may be generated for implementation by the second PHE. Accordingly, the first synchronization module in the first hardware description and the second synchronization module in the second hardware description may be configured to communicate with each other to synchronize the first user-created code in the first hardware description and the second user-created code in the second hardware description.

BRIEF DESCRIPTION OF THE DRAWINGS

A better understanding of the present invention can be obtained when the following detailed description of the preferred embodiment is considered in conjunction with the following drawings, in which:

FIGS. 3A-3C illustrate exemplary systems for implementing various embodiments;

Figure 1:
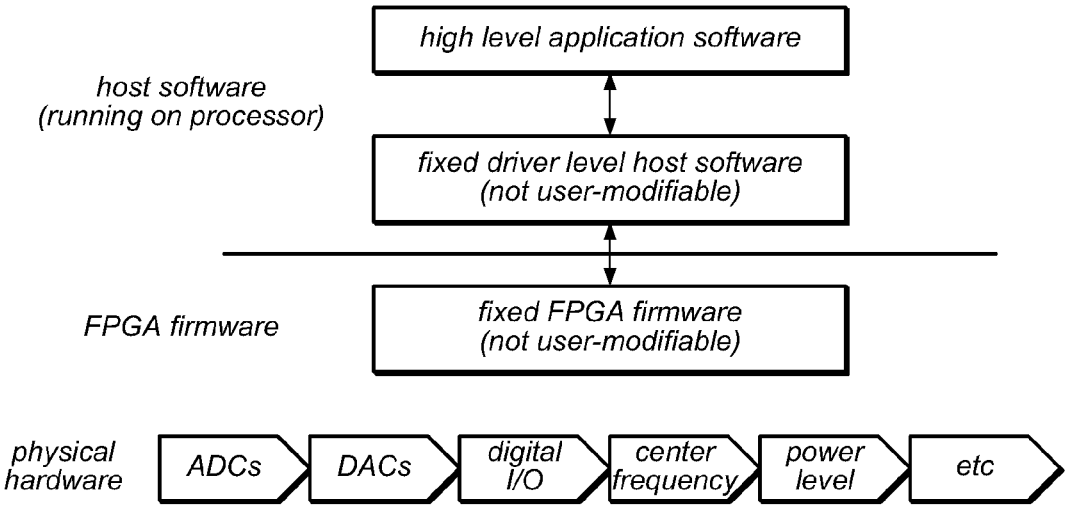
FIGS. 1 and 2 illustrate block diagrams of prior art test instrument configuration models.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. application Ser. No. 13/527,208, titled "Modifying a Target System Configuration to Utilize a Different Synchronization Module for Performing Synchronization among Multiple Programmable Hardware Elements", filed Jun. 19, 2012.

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,210,117 titled "System and Method for Programmatically Generating a Graphical Program in Response to Program Information," filed Dec. 20, 2000.

U.S. patent application Ser. No. 13/398,529, titled "Customizing Operation of a Test Instrument Based on Information from a System Under Test", filed Feb. 16, 2012.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Data flow programs can be contrasted with procedural programs, which specify an execution flow of computations to be performed. As used herein "data flow" or "data flow programs" refer to "dynamically-scheduled data flow" and/or "statically-defined data flow".

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 3A:
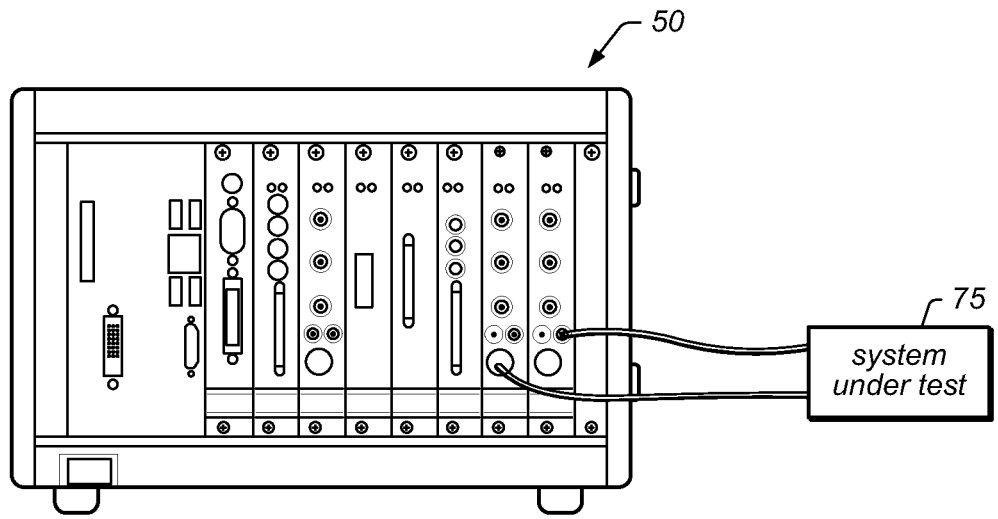
Figure 3B:
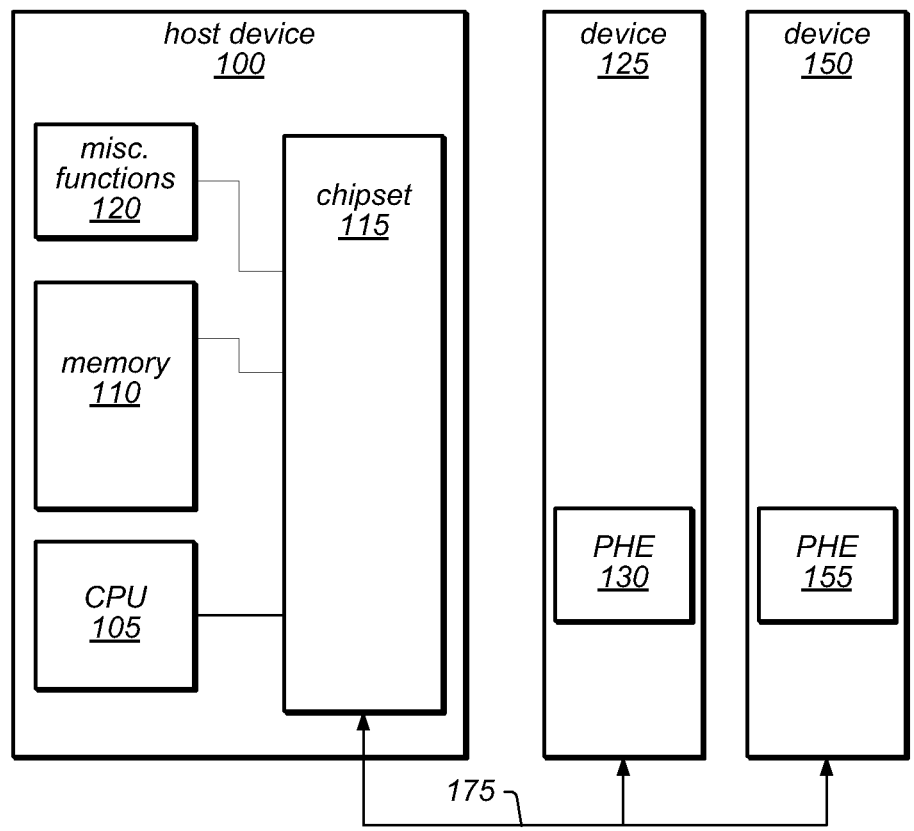

FIGS. 3A-3C—Exemplary Systems

FIGS. 3A-3C illustrate exemplary systems which may implement embodiments described herein. As shown in FIG. 3A, an exemplary test instrument 50 (also referred to as an "instrumentation device" or "testing device") is coupled to a system under test (SUT) 75. As used herein, an SUT covers the term "device under test" or "DUT". In the embodiment of FIG. 3A, the test instrument 50 is implemented as a chassis which is configured or operated to test the SUT 75.

The test instrument 75 may include one or more inputs and outputs for connecting to the SUT 75. The inputs and outputs may be analog, digital, radio frequency, etc., e.g., at various voltage levels and frequencies. The test instrument 75 may be configured to perform one or more tests or may implement various features for performing testing of the SUT 75. For example, the test instrument 50 may be configured to capture waveforms, calculate measured power, generate a tone at a programmed frequency, etc. The test instrument 50 may be calibrated in order to achieve a specified level of accuracy on its input/output (I/O). For example, the test instrument 50 may be configured to generate a sine wave at 1V peak-peak, within +/−10 mV of accuracy. The test instrument 50 may be configured and/or may operate in the manner described herein.

The SUT 75 may be any of various devices or systems which may be desired to be tested, such as a various radio frequency (RF) devices, semiconductor integrated circuits, consumer electronics, wireless communication devices (such as cell phones), computers, automobile electronics, energy devices, measurement devices, etc. In one embodiment, the test instrument 50 may be configured to perform various testing of the SUT 75, e.g., on signals acquired from the SUT 75. In one embodiment, the chassis may acquire measurements of the SUT 75, such as current, voltage, etc., e.g., using analog sensors, and/or digital signals using digital I/O.

FIG. 3B illustrates an exemplary block diagram of one embodiment of the test instrument 50. As shown, the test instrument 50 may include a host device 100 (e.g., a host controller board), which may include a CPU 105, memory 110, and chipset 115. Other functions that may be found on the host device 100 are represented by the miscellaneous functions block 120. In some embodiments, the host device 100 may include a processor and memory (as shown) and/or may include a programmable hardware element (e.g., a field programmable gate array (FPGA)). Additionally, one or more of the cards or devices (e.g., device 125 and/or 150) may also include a programmable hardware element, such as PHE 130 and PHE 155, respectively. In further embodiments, a backplane of the test instrument 50 may include a programmable hardware element. In embodiments including a programmable hardware element, it may be configured according to a graphical program as described in the various patents incorporated by reference above.

As shown, the host device 100 (e.g., the chipset 115 of the host device 100) may provide communication (e.g., PCIe communication, PXI communication, or other bus communication) to a first peripheral device 125 and a second peripheral device 150 over bus 175. The first peripheral device 125 and second peripheral device 150 may be configured to change configurations based on information provided by the host device 100, as described herein.

The devices may be any of various devices (e.g., PCIe devices), such as measurement devices (e.g., DAQ devices), processing devices, I/O devices, network devices, etc. Additionally, similar to above, the devices may include one or more programmable hardware elements or processors and memory to implement their respective functionality. In some embodiments, the devices 125 and 150 may be configured to acquire signals from the SUT 75 to perform testing. For example, the device 125 may be configured to measure and perform analog to digital conversion for voltage of the SUT 75. Similarly, the device 150 may be configured to measure and perform analog to digital conversion for current of the SUT 75. Further devices may be included in the chassis 50, such as devices for performing GPS measurements, e.g., acquiring time using GPS circuitry for synchronization purposes, among other possibilities.

In some embodiments, multiple SUTs 75 may be measured concurrently. For example, one or more devices in the test instrument 50 may be used for performing concurrent measurement, such as for RF testing, among other possibilities. Further, the test instrument 50 and/or devices included therein may be configured to perform measurements over a network, such as a wireless network (e.g., 802.11, WiMax, etc.).

Figure 2:
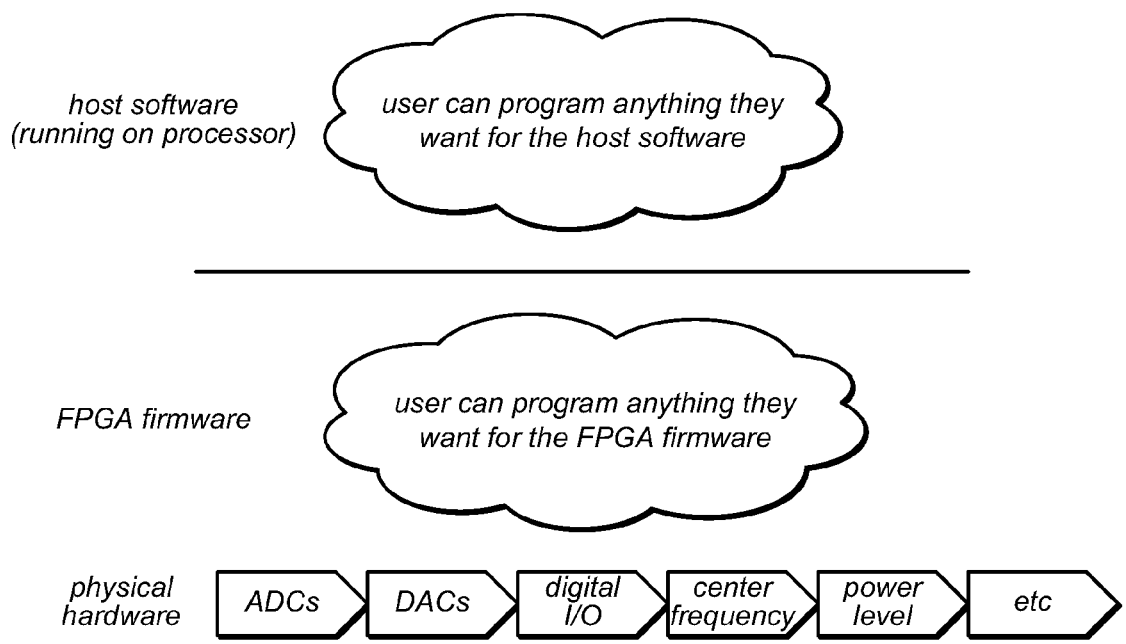

FIG. 3C illustrates host device 100 as a computer system. As shown in FIG. 2A, the host device 100 may be coupled to chassis 50 (e.g., including the first device 125 and the second device 150) and may include a display device and one or more input devices. Similar to descriptions of the host device 100 above, the host may include at least one memory medium on which one or more computer programs or software components according to one embodiment of the present invention may be stored. For example, the memory medium may store one or more graphical programs which are executable to perform the methods described herein. Additionally, the memory medium may store a graphical programming development environment application used to create and/or execute such graphical programs. The memory medium may also store operating system software, as well as other software for operation of the computer system. Various embodiments further include receiving or storing instructions and/or data implemented in accordance with the foregoing description upon a carrier medium. In alternate embodiments, the chassis 50 may include a host device and the computer system may be configured to communicate with the host device in the chassis 50. For example, the computer system may be used to configure the host device in the chassis 50 and/or the devices 125 and 150 also included in the chassis 50.

In various embodiments, the host device 100 may be coupled to a second computer system or device via a network (or a computer bus). The computer systems may each be any of various types, as desired. The network can also be any of various types, including a LAN (local area network), WAN (wide area network), the Internet, or an Intranet, among others. Similarly, the host device 100 may be coupled to the test instrument 50 via various mechanisms.

Figure 4:
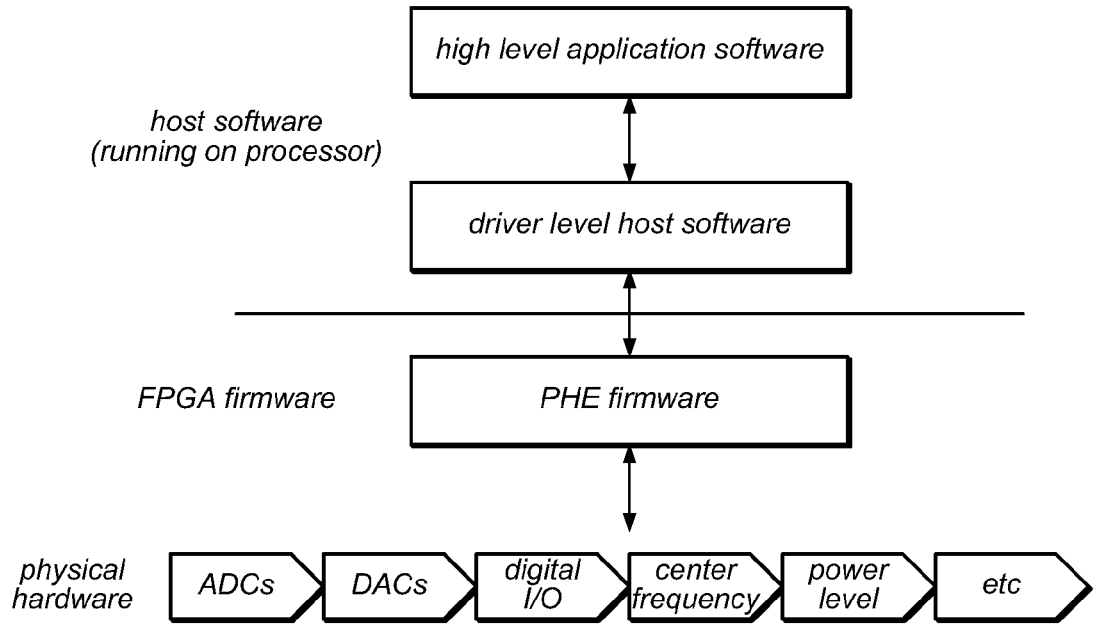
FIG. 4 illustrates a block diagram of an exemplary configuration model for a test instrument, according to one embodiment.

FIG. 4—Block Diagram of Exemplary Configuration Model for a Test Instrument

FIG. 4 is a block diagram illustrating an exemplary configuration model for a test instrument. As shown, the lowest level of the test instrument may be the physical hardware. In this embodiment, the hardware may include ADCs, DACs, digital I/O, center frequency (e.g., clocking hardware and/or local oscillators), power level (e.g., analog gain and/or attenuation hardware), etc. In one embodiment, this is the I/O that a user may have access to, e.g., during customization, and the hardware necessary to make that I/O function properly.

As also shown, above this level is the PHE firmware, which may communicates with the physical hardware and the driver level host software and may implement the hardware features of the device. The driver level host software may execute on the computer (or controller) and may have an API that allows the user to access the features of the device. At the highest level is the application software, which may call into (or otherwise utilize) the driver level API.

The various embodiments provided herein may be particularly applicable to the configuration model shown in FIG. 4. More specifically, a user may be able to customize or configure both the configuration and code of the host software as well as the configuration and code of the firmware, implemented on a programmable hardware element. In one embodiment, the customizations described below may particularly apply to the customization of the driver level software and programmable hardware element firmware portion of the system.

Figure 5:
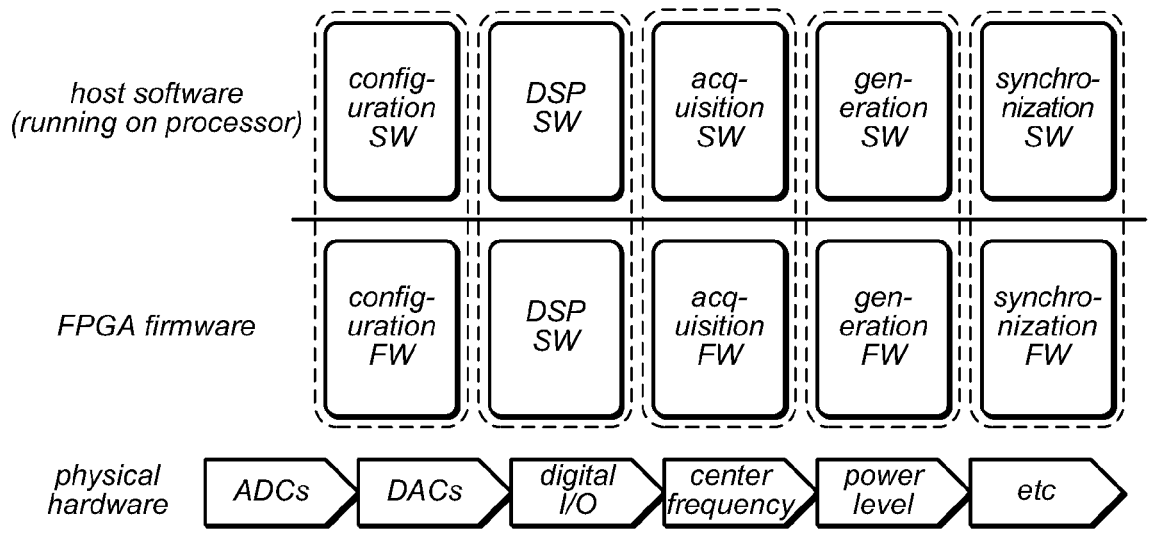
FIG. 5 is a block diagram of an exemplary configuration module including a plurality of code module pairs, according to one embodiment.

FIG. 5—Block Diagram of Configuration Model with Pairs of Code Modules

FIG. 5 illustrates a more specific configuration model of FIG. 4. In this embodiment, major components in the software and firmware of FIG. 4 have been broken into five code module pairs (processor-side and PHE-side code modules). These code pairs may implement at least the basic functionality typically found in a test instrument. The software code modules may correspond to driver level host software and/or high level application software, as desired. The processor-side code modules may be executed by one or more processors of the test instrument (e.g., located in the host 100, device 125, device 150, etc.) and the PHE-side code modules may be implemented by one or more PHEs of the test instrument (e.g., located in the devices 125, device 150, etc.).

As shown, the code module pairs include configuration, DSP, acquisition, generation, and synchronization, although more or less pairs are also envisioned. The configuration code module pair may be used for programming the physical hardware to a given state (e.g., power level, frequency, data rate, etc), and/or calibrating the test instrument. The DSP code module pair may be used for changing the sample rate of the data, filtering the data to improve the frequency response of the test instrument, digitally changing the gain of the data, or other processing. The acquisition code module pair may be used for acquiring data from the inputs and for provision to the host. The generation code module pair may be used for sending data from the host out the outputs. The synchronization code module pair may be used for aligning I/O between multiple modules or cards within the test instrument and/or between multiple test instruments, as desired.

These code modules may be provided to the user in a number of ways. For example, the code modules may be provided within a configuration tool or development environment, which may be used to configure the test instrument. For example, the user may install software on a computer system (e.g., the computer system 100 of FIG. 3C) and may use the software to configure the test instrument. In one specific embodiment, the code module pairs may be installed within or along with a development environment, e.g., a graphical programming development environment, such as LabVIEW® provided by National Instruments.

In one embodiment, the code modules may be included in one or more graphical programs having a plurality of nodes connected by wires. For example, there may be a first graphical program corresponding to software of the host of the test instrument and a second graphical program corresponding to the PHE of the test instrument. Alternatively, the functionality of the test instrument may be fully specified in a single graphical program. The interconnected nodes of the graphical program(s) may visually represent functionality of the one or more graphical programs. However, the code modules may be provided in a number of different development environments, and are not limited to graphical programming embodiments.

In one embodiment, the code modules may be provided in one or more templates within the development environment. For example, a user may be able to open a template project which includes the code modules and which may be ready for configuration to a test instrument (e.g., may be operable without modification). Accordingly, the user may be able to simply modify the already present code modules in order to configure to the test instrument to implement the desired behavior. The code modules may appear as individual modular blocks (e.g., which are interconnected) on the display of the computer system. In one embodiment, a user may be able to expand each block to modify its functionality (e.g., where it may be represented by a node, such as a sub-VI, which expands into a graphical program in graphical programming embodiments). Alternatively, or additionally, the code modules may simply be included in a program with sections corresponding to each of the modular blocks. For example, the template may include a first set of code for the host and a second set of code for the programmable hardware element. Each of these sets of codes may have sections corresponding to each of the modular blocks (e.g., where each section is labeled, such as by a color, which indicates which modular block the section or individual nodes correspond to).

In some embodiments, the code modules (and/or pairs of code modules) may be provided within a palette or library. For example, a user may select which code modules (or pairs of code modules) he would like included in the program. The user may include these modules by selecting the desired code modules and manually including them in the desired program (e.g., by dragging and dropping them into a graphical program, possibly from a palette, following graphical programming embodiments). Alternatively, or additionally, the user may simply select the desired code modules, and they may be automatically assembled or integrated into a new or existing program. For example, a test instrument wizard (e.g., a series of GUIs) may be displayed on the display where a user may select the desired functionality of the test instrument, e.g., by selecting the desired functionality. In response, a program or configuration may be automatically created or assembled which implements the desired functionality, e.g., by automatically including the appropriate code modules. Thus, the code modules may be specified or provided in a number of ways.

As discussed below, these code modules may be customized by the user. More specifically, the user may be able to choose which of the code modules to keep, which to change, and which to eliminate, without affecting the functionality or behavior of the other code modules. Because the code modules may be provided, e.g., within a development environment or configuration tool of the test instrument, a user may be able to fully customize the functionality of the test instrument, e.g., without having to write much code.

Additionally, an application programming interface (API) may be provided for interacting with the plurality of pairs of code modules. For example, this API may be used by the "high level application software" of FIG. 4 to interact with the driver level host software and PHE firmware (e.g., corresponding to the pairs of code modules of FIG. 5). In some embodiments, this API may remain unchanged and usable even after modification or customization.

While FIGS. 4 and 5 have been described as having both software and PHE side code (e.g., code module pairs), embodiments herein may also apply to PHE only synchronization. Thus, the pairs of code modules (including processor-side modules) are exemplary only and may not be required in certain embodiments described herein.

Figure 6:
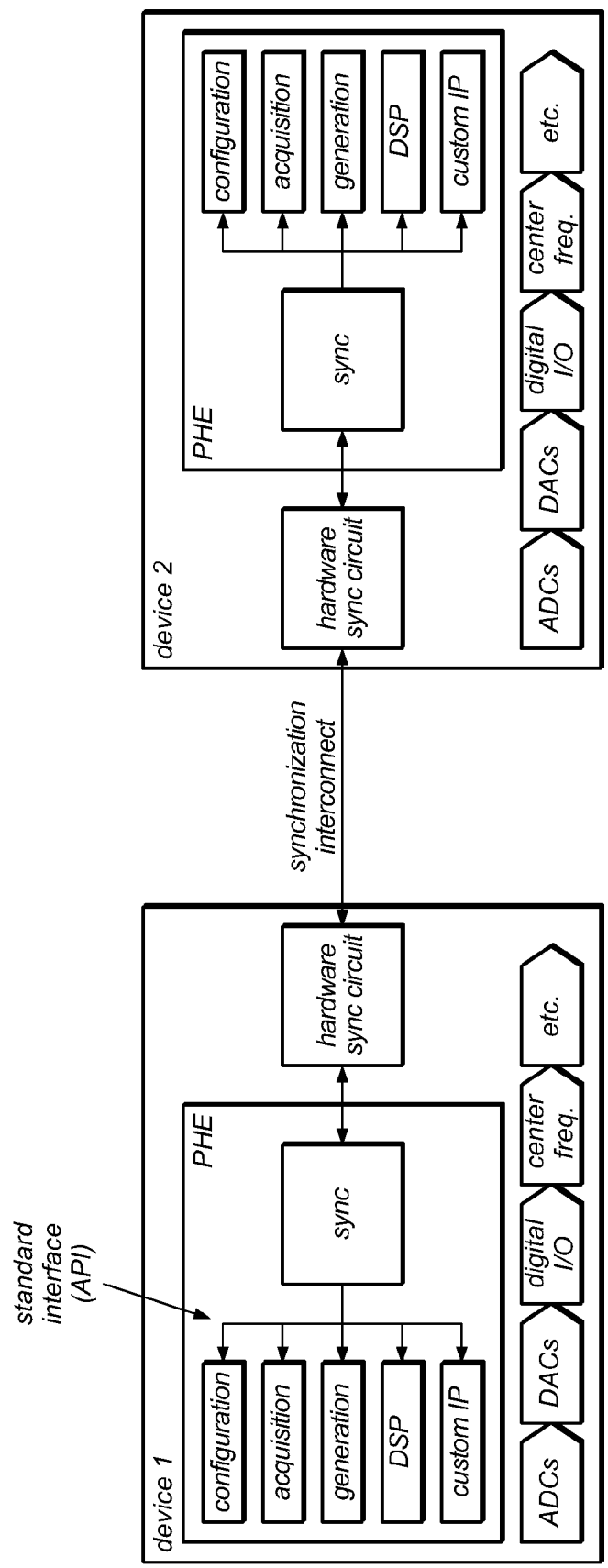
FIG. 6 is a block diagram of an exemplary configuration model for performing synchronization, according to one embodiment.

FIG. 6—Exemplary Configuration Model for Performing Synchronization

FIG. 6 illustrates an exemplary configuration model for performing synchronization. As shown, synchronization IP or modules may be provided that expose a standard interface (e.g., an API) for synchronizing other modules or code within the test instrument. This standard interface can be used to synchronize both pre-defined code modules (e.g., such as those described in FIG. 5 above) as well as custom code that the user specifies. The synchronization module may allow for full programmability of synchronization. More specifically, this programmability may allow the user to fully define what should be synchronized and when it should be synchronized during operation of the test instrument. For example, the user might want to synchronize multiple acquisition engines across devices fully independently from the generation engines. A different application may elect to synchronize acquisition and generation engines together.

In one embodiment, a library or set of synchronization modules may be provided. For example, the set of synchronization modules may include modules for various types of systems, different system interconnects, different types of synchronization, etc. Accordingly, a user may be able to select desired synchronization modules for use in a test instrument. In one embodiment, the user may select a template, e.g., corresponding to his desired system or type of interconnect, which includes the appropriate synchronization modules with a template configuration. In further embodiments, the appropriate synchronization modules may be automatically selected or provided based on an automatic detection of a connected test instrument, e.g., based on characteristics of the system, available interconnects, etc.

The standard interface may also allow variance of the physical synchronization interconnect without needing to change the modules or code that are being synchronized. For example, a user may initially build his system with a PXI trigger bus as a synchronization interconnect between the instruments. Later, the application might require more physical separation between the instruments, and thus the user might replace the PXI trigger bus with an Ethernet link. Accordingly, the user may be able to replace the PXI trigger-based synchronization module with the Ethernet-based synchronization module on both instruments, while still preserving the same standard interface to their other modules or code on the instrument. Alternatively, as indicated above, this change may be automatically detected and the synchronization modules may be automatically replaced.

Note that this approach may not assume synchronization simultaneity. That is, the standard interface may not limit the IP to performing synchronized events simultaneously on each instrument. Using this approach, the user may intelligently control the occurrence of events on each instrument, even if those events happen at different moments in time.

Figure 7A:
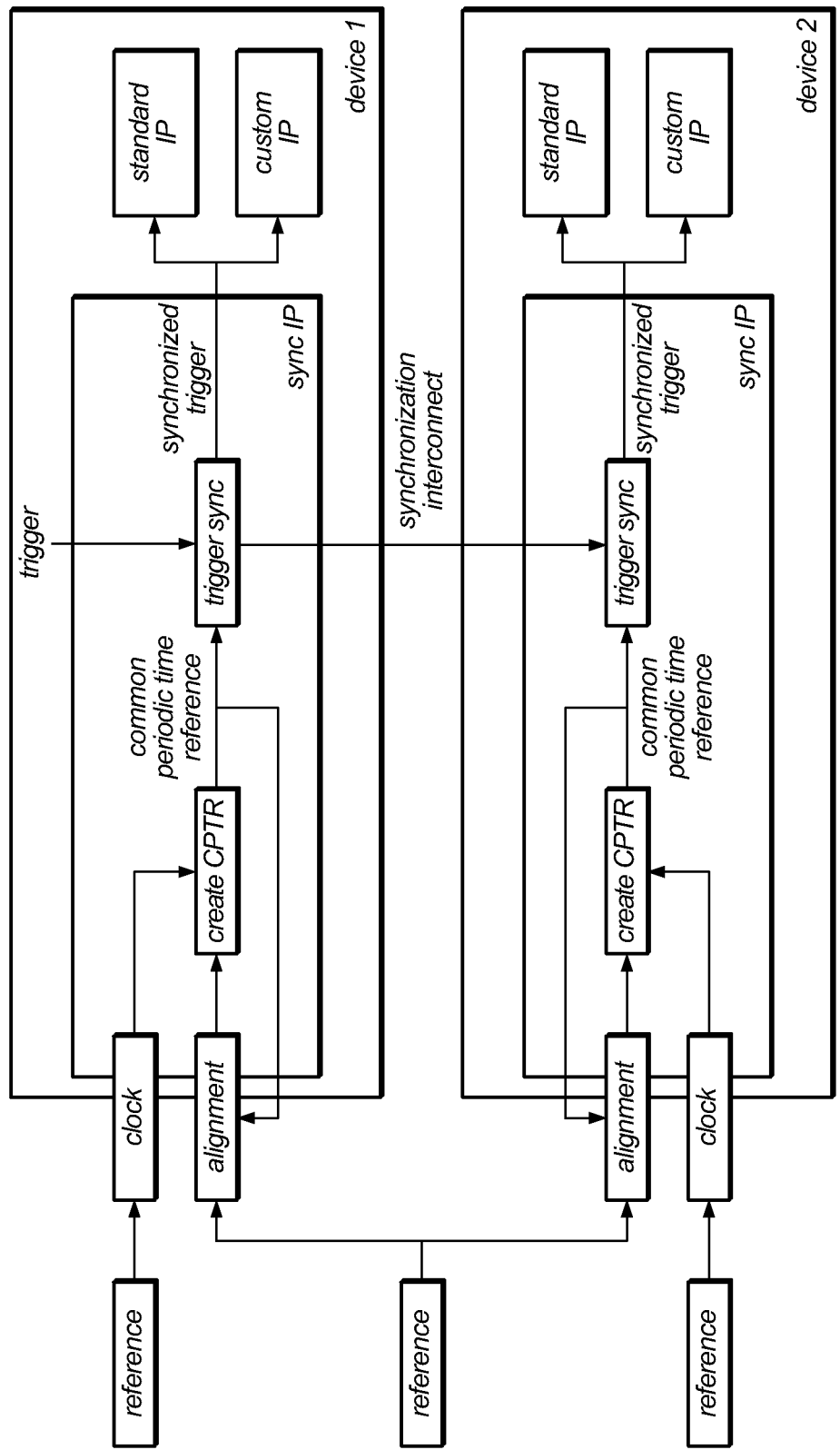
FIGS. 7A-7D are diagrams of an exemplary synchronization model, according to one embodiment.
Figure 7B:
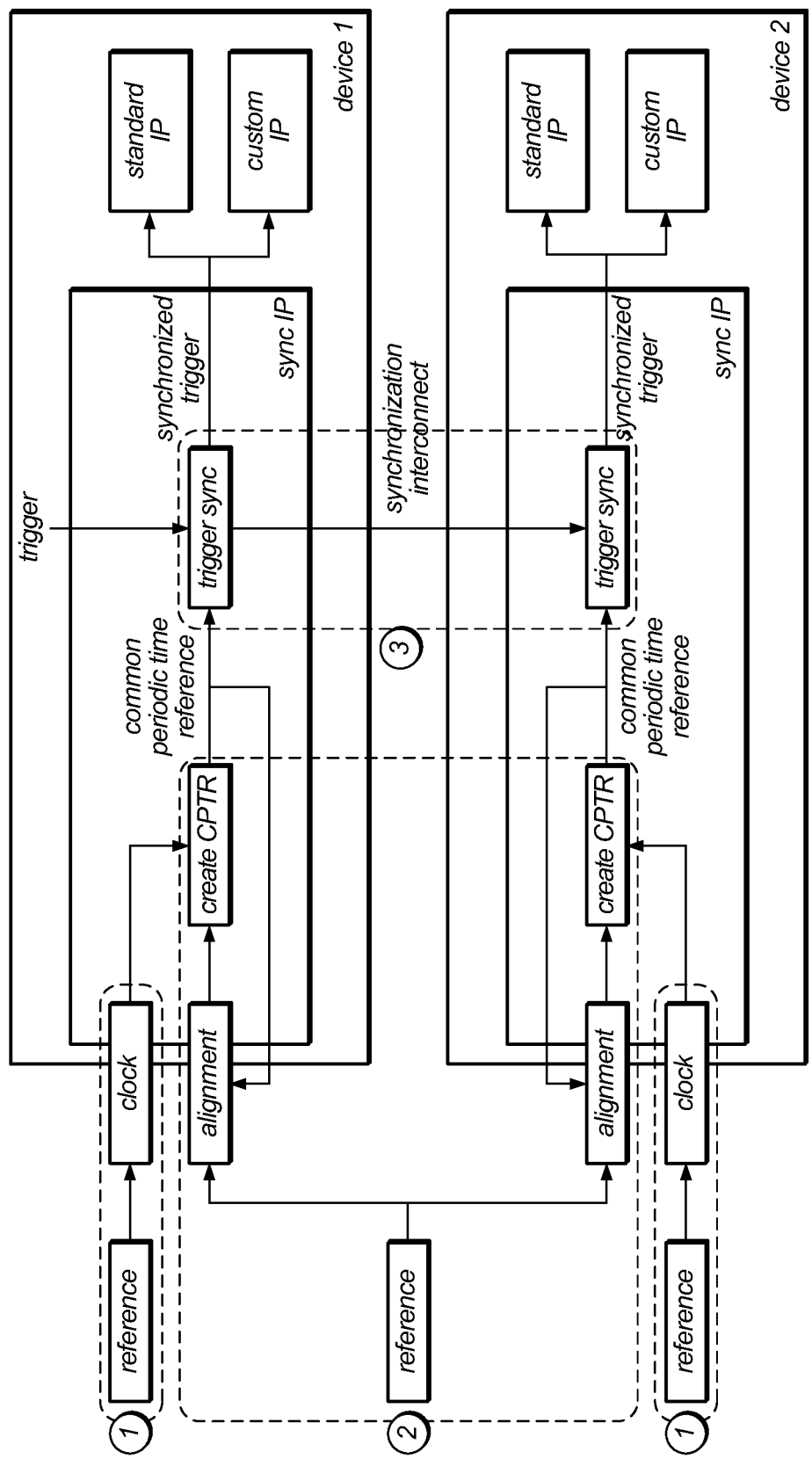

FIGS. 7A and 7B—Exemplary Synchronization Model

FIGS. 7A and 7B illustrate an exemplary synchronization model that may be used in the embodiments described herein. More specifically, the "standard interface" of the synchronization modules may include interfaces such as the "Synchronized Trigger" and the "Common Periodic Time Reference" (CPTR) shown in FIGS. 7A and 7B. In one embodiment, different synchronization interconnects may require different implementations that produce these interfaces, but the interface may remain the same. This allows the user to vary the type of synchronization modules without changing the interface to the other code in the application that is being synchronized.

The synchronization model may generally provide high-level synchronization steps that each of the synchronization modules may adhere to. More specifically, the synchronization may involve:

1) Establishing a fixed relationship between clocks;
2) Identifying and establishing a common periodic time reference; and
3) Triggering on the common periodic time reference FIG. 7B highlights these three steps in the example of FIG. 7A. More specifically, the functionality of the three steps are highlighted in FIG. 7B, including establishing a fixed relationship between clocks by providing a common reference; establishing a common periodic time reference, including alignment; and finally, using the common periodic time reference to perform triggering. Accordingly, synchronized triggers may be provided to code within the devices, which may be used to perform operations of the test instrument in a synchronized fashion.

Figure 7C:
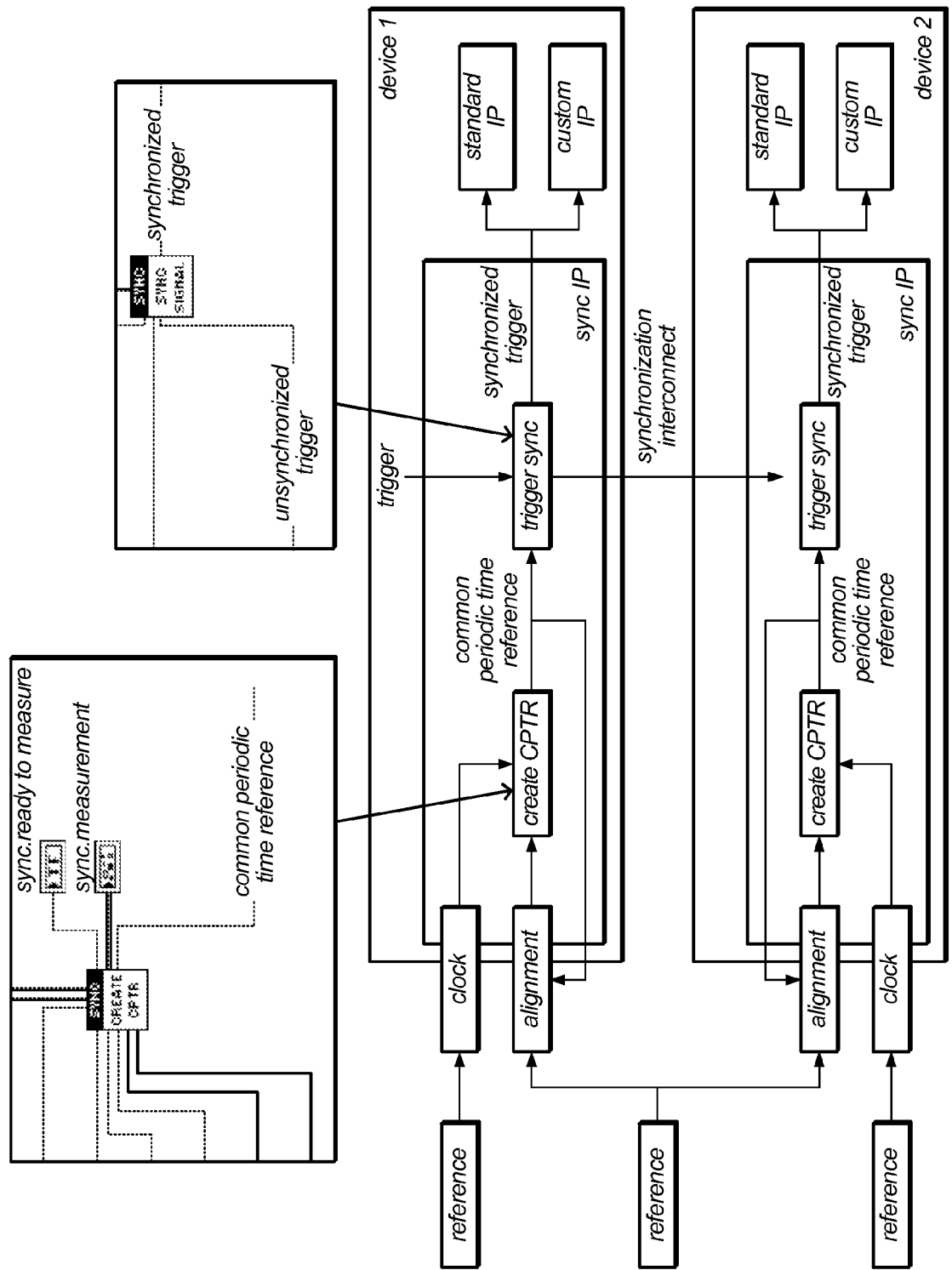

FIG. 7C provides more details, within a graphical programming embodiment, of two exemplary aspects (e.g., API functions or calls) that may be used for the standard interface: "Create Common Periodic Time Reference" and "Synchronize Signal". In one specific example, these particular functions may be used when a simple digital trigger bus is used as a synchronization interconnect. This Figure also shows where these interfaces are used in the overall synchronization model. Users may invoke these functions directly and have access to all of their inputs and outputs.

In more detail, CPTR may be used to create a periodic signal that is phase and frequency aligned across all participating devices. This CPTR signal may be used by the code that synchronizes a signal across all instruments. The "Synchronize Signal" function may be responsible for accepting an unsynchronized signal from one device, distributing it to all other devices, and then producing a synchronized signal on each device (e.g., which asserts at the same moment in time on all instruments). Users can associate this synchronized signal up to any custom code or other modules. The "Synchronize Signal" function call may also accept the CPTR signal, which may be used as part of the synchronization algorithm.

In this exemplary embodiment, users may synchronize custom triggers by simply associating their custom trigger to the input of the "Synchronize Signal" interface. Additionally, users can use multiple "Synchronize Signal" interfaces on each instrument if they want to simultaneously synchronize lots of different signals.

Figure 7D:
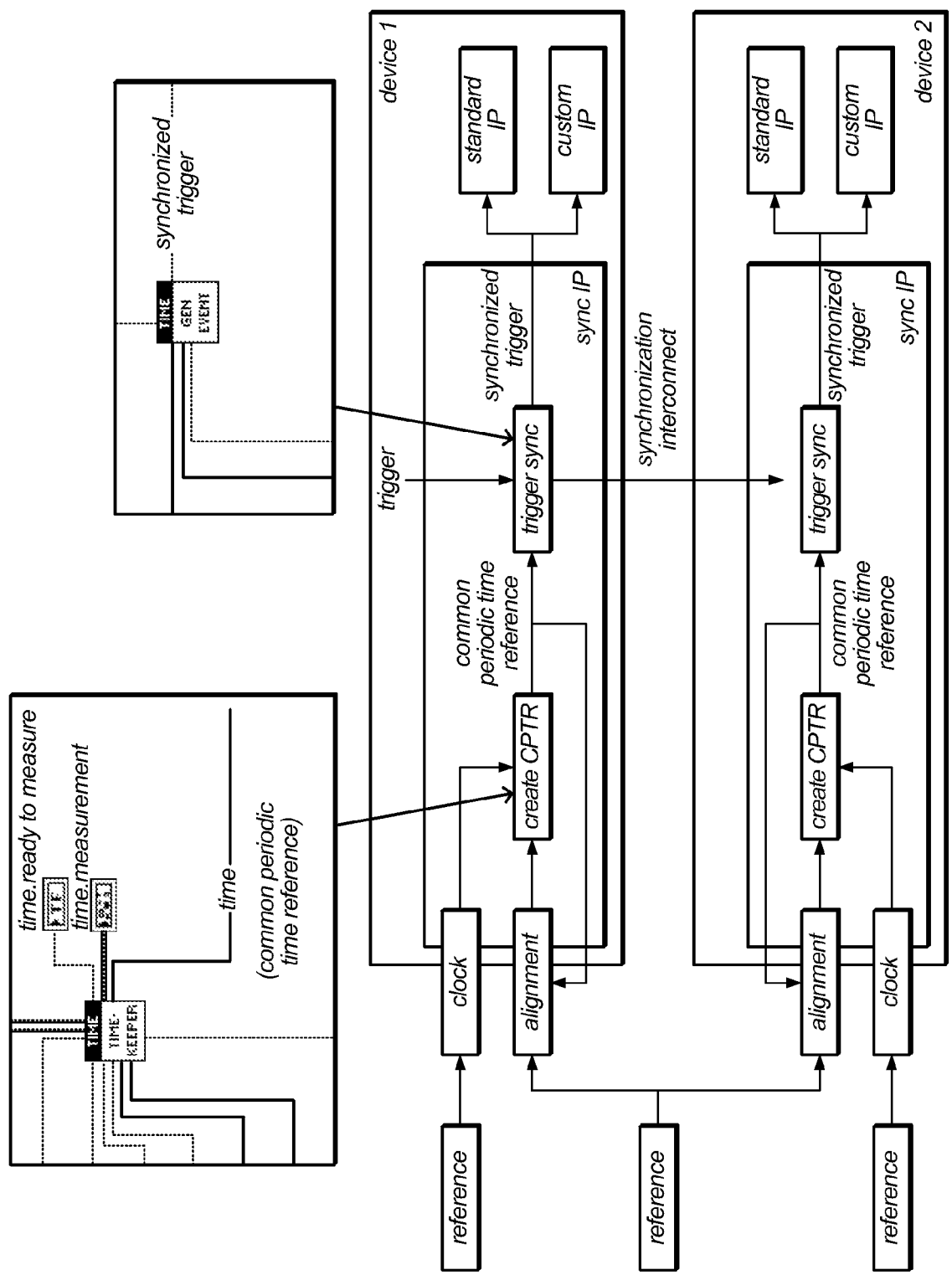

FIG. 7D provides more details, within a graphical programming embodiment, of two exemplary aspects (e.g., API functions or calls) that may be used for the standard interface: "Timekeeper" and "Generate Future Time Event". The Timekeeper call may produce a real-world time value that is aligned across all participating devices. This time value may be effectively the common periodic time reference that may be used to produce synchronized signals. The "Generate Future Time Event" may be used to produce synchronized signals on all participating devices. The user may program this interface to generate a signal at a particular time (e.g., the future time). This function call may then continually monitor the current time and generate an event at the specified time. If the user wants to produce synchronized events, he may simply schedule the same future time event on all devices.

The user may invoke these function calls directly and may have access to all of their inputs/outputs. Just like the example in FIG. 7C, the user can synchronize custom triggers. He may do this by writing custom code that programs future time events into the "Generate Future Time Event" interface.

While embodiments herein discuss the provision of synchronization modules (e.g., which are fully operational, such as, for a specific type of interconnect), these modules may also be user modifiable. For example, a user may customize the provided synchronization module, e.g., to modify the particular synchronization method performed, support a new interconnect, augment the standard interface, etc. Additionally, the user may generate his own synchronization modules, e.g., which provide the standard interface and/or follow the synchronization model discussed above. These modules may be created or modified using synchronization module components (e.g., which perform portions of the model described above). For example, there may be a plurality of module components for performing different types of synchronizations or using different types of synchronization interconnects that a user may use to create or modify existing synchronization modules. Further, the user may even modify or create the underlying code of these module components, as desired.

In one embodiment, a graphical user interface (GUI) may be provided to perform various configurations, e.g., to select synchronization modules, to configure the synchronization modules, to configure user-created code, to make modifications, etc. For example, a wizard or series of GUIs may be used for any of these configurations or customizations.

Figure 8:
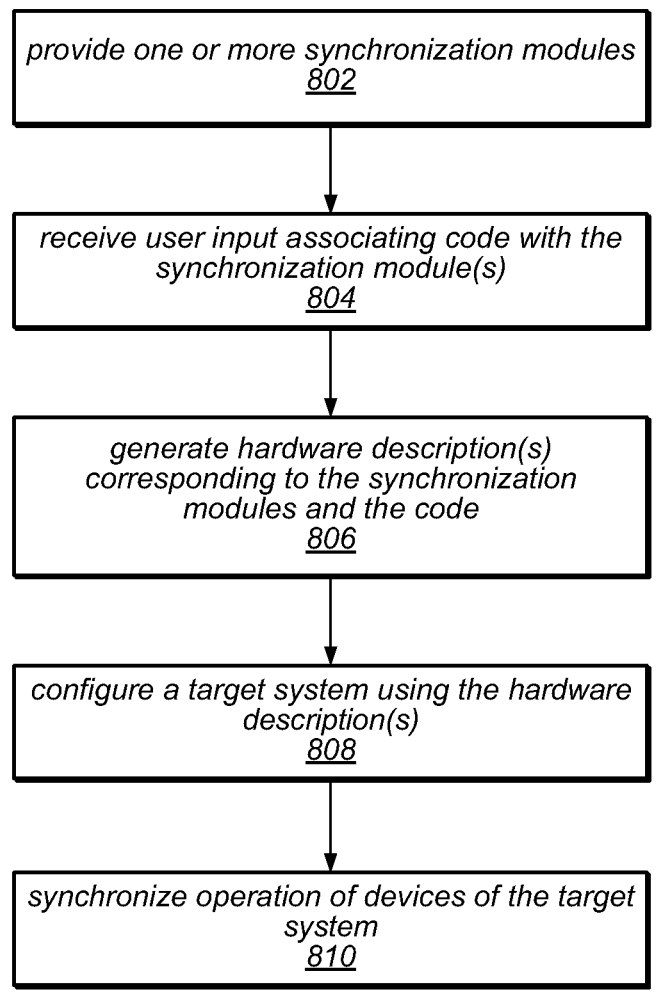
FIG. 8 is a flowchart diagram illustrating one embodiment of a method for configuring synchronization in a target system.

FIG. 8—Configuring Synchronization in a Target System

FIG. 8 illustrates a method for configuring synchronization in a target system. The method shown in FIG. 8 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 802, one or more synchronization modules may be provided to configure synchronization between two devices of a target system. Similar to systems discussed above, the target system may include a first device with a first PHE and a second device with a second PHE. In one embodiment, the target system may be a test instrument which is configured to test a system under test (SUT). For example, the test instrument may include measurement devices (e.g., each having PHEs) for performing the testing of the SUT.

The synchronization modules may at least include code for implementation on the PHEs of the devices. In one embodiment, the synchronization modules may be specific to PHEs only, i.e., may only have code for implementation on a PHE. Alternatively, the synchronization modules may include a PHE-side component and a processor-side component, e.g., similar to the pairs of code modules described above regarding FIG. 5. Other types of modules are also envisioned.

As discussed above, the synchronization modules may provide a standard interface for interacting with other code, such as user-created code or other types of modules (e.g., those listed above regarding FIG. 5, among other possibilities). For example, the synchronization modules may use a standard API for performing synchronization functions for other code. In one embodiment, a first synchronization module may be used for the first device (e.g., the first PHE) and a second synchronization module may be used for the second device (e.g., the second PHE). These two synchronization modules may be the same (e.g., two instantiations of a same module) or may be different (e.g., where the two modules correspond, but one is different from the other, such as in a master-slave relationship).

In 804, user input may be received associating code with the synchronization modules. For example, a user may specify custom code or user-created code which implements desired functionality of the target system. By associating the code with the synchronization modules, the user may synchronize operation of the two devices, e.g., operation of the custom code implemented on the two devices, by using the synchronization modules. For example, the user may specify that the custom code of the first device uses a first synchronization module that is targeted for the first device. Similarly, the user may specify that the custom code for the second device uses a second synchronization module that is targeted for the second device.

Thus, in one embodiment, the user may specify code for the first device (e.g., for implementation on the first PHE) as well as code for the second device (e.g., for implementation on the second PHE). The synchronization modules may be used to synchronize operation of the code implemented on the two devices. For example, the synchronization blocks may be used to perform resetting of DSP blocks, controlling hardware reconfiguration, triggering data capture or generation engines, creating aligned timestamps, etc. These synchronization actions may be performed using the API, e.g., using custom triggers configured by the user, as discussed below.

The code may be specified in any of a variety of manners. For example, the user may specify the code in a graphical program, e.g., by assembling nodes and connecting the nodes within a graphical programming development environment. Accordingly, the user may connect (e.g., via wires) node(s) of the custom code with the synchronization module(s) to perform the association. As indicated above, the synchronization modules may use a common interface so that the same connections in the graphical program could be used for any of a variety of synchronization modules. Alternatively, or additionally, the user may specify the code via text and may associate the code by using API calls or functions that are supported by the API of the synchronization modules.

In one embodiment, the user may specify one or more custom triggers for performing synchronization of the code. For example, the user may desire to use a first trigger that is used to perform a first type of synchronization (e.g., while performing a first action) and a second trigger that is used to perform a second type of synchronization (e.g., while performing a second action). In one embodiment, the user may use the standard API to invoke a trigger and may label the trigger in the API call. Accordingly, when the trigger is provided, it may have a custom name or other type of characteristic that may allow it to be distinguished from other triggers. Accordingly, the custom code may be configured to use a plurality of triggers (e.g., customized triggers) via the synchronization module(s).

Note that there may be multiple synchronization modules, e.g., for different types of synchronizations, different interconnects (e.g., Ethernet, wireless, simple digital interface, optical link, etc.), etc. However, each of these synchronization modules may use or present the same interface, and may thus allow for interchangeability, e.g., without any modification of code that interacts with the synchronization modules. Accordingly, the user may initially use synchronization module(s) that are associated with a first type of interconnect, but may modify the configuration or program to use a second type of interconnect. Thus, the user may modify the configuration to use a second synchronization module that is associated with the second type of interconnect, but without being required to modify his code, e.g., because of the standard interface. Alternatively, the second synchronization module may be automatically selected or used in response to selection or detection of the second type of interconnect. More specific details on such an embodiment are provided below, regarding FIG. 13.

In further embodiments, a plurality of different synchronization modules may be selected for the target system. For example, these different synchronization modules may perform synchronization in different manners, using different interconnects (e.g., where more than one is available), etc. Additionally, the user may provide input creating selection code that dynamically selects one of the synchronization modules based on run-time operation of the target system. For example, the selection code may be configured to detect a current configuration and automatically select the appropriate synchronization module based on the detected configuration. As another example, the selection code may be configured to perform tests of the different synchronization modules and select the best or most effective synchronization method, e.g., based on user specified criteria. In even further embodiments, the user may not need to specify the selection code and this process may be performed automatically, e.g., based on synchronization modules selected by the user. More specific details on such an embodiment are provided below, regarding FIG. 18.

In 806, based on the user specified code and the synchronization modules described above (among other possible code or modules), a first hardware description may be generated for implementation by the first PHE. Similarly, a second hardware description may be generated for implementation by the second PHE. Accordingly, the first synchronization module in the first hardware description and the second synchronization module in the second hardware description may be configured to communicate with each other to synchronize the first user-created code in the first hardware description and the second user-created code in the second hardware description. Generation of the hardware description may involve conversion of the code to hardware description level (HDL) code, such as Verilog, for implementation on the PHE(s) of the target system. The PHE code may be implemented in various locations, e.g., within individual devices of the test device (e.g., devices 125 and/or 150 of FIG. 3B), and/or in other locations, e.g., the backplane of the chassis 50. In one embodiment, a netlist may be generated (e.g., from the HDL code) for programming gates of the PHE(s). In graphical programming embodiments, the generation of HDL code or netlists may be performed in the manner described in U.S. Pat. No. 6,219,628, which was incorporated by reference in its entirety above.

Where the user-specified code and the synchronization module(s) involve more than PHE-side code, e.g., including processor-side code, program instructions corresponding to the user-specified code and the synchronization modules may also be generated. For example, the software of the processor-side code modules may be compiled for execution by processor(s) of the target system. For example, the type of processor(s) of the target system may be specified or detected and the program instructions may be generated to correspond to the instruction set of the detected type of processor(s). There may be processors in various different locations within the target system, e.g., within a host, which may be collocated with the PHE(s) and underlying hardware or not (e.g., within the chassis or coupled to the chassis, as shown in the embodiments of FIGS. 3B and 3C). Additionally, there may be processors within individual cards or devices of the test device (e.g., devices 125 and/or 150 of FIG. 3B). Thus, the software may be executed by one or a plurality of processors located in various different areas of the test device.

Finally, in 808, the target system may be configured according to the hardware description(s). Additionally, where there is processor-side code, the target system may be configured with the program instructions generated above. In this embodiment, the PHEs of the target system may be programmed according to the generated HDL code or netlist(s) and the program instructions may be stored on one or more memory mediums of the target system, e.g., for execution by processor(s) of the target system. Note that the program instructions may be stored in a host portion of the target system, which may be included within the same enclosure as the PHE of the target system (e.g., and underlying hardware) or may be separate from the enclosure of the PHE of the target system (e.g., of an external computer system coupled to a chassis containing the PHE and underlying hardware). In either case, the target system may include both the host and PHE portions, even if the host portion is implemented via a separate computer system. The target system may then be configured and may be ready to operate as configured, e.g., to test an SUT.

Finally, in 810 the target system may operate. During operation, the target system may synchronize functionality between the two devices, according to the configuration discussed above.

While the above method has been described with respect to two devices, it may easily be extended to include synchronization among any number of devices in a similar manner.

Figure 9:
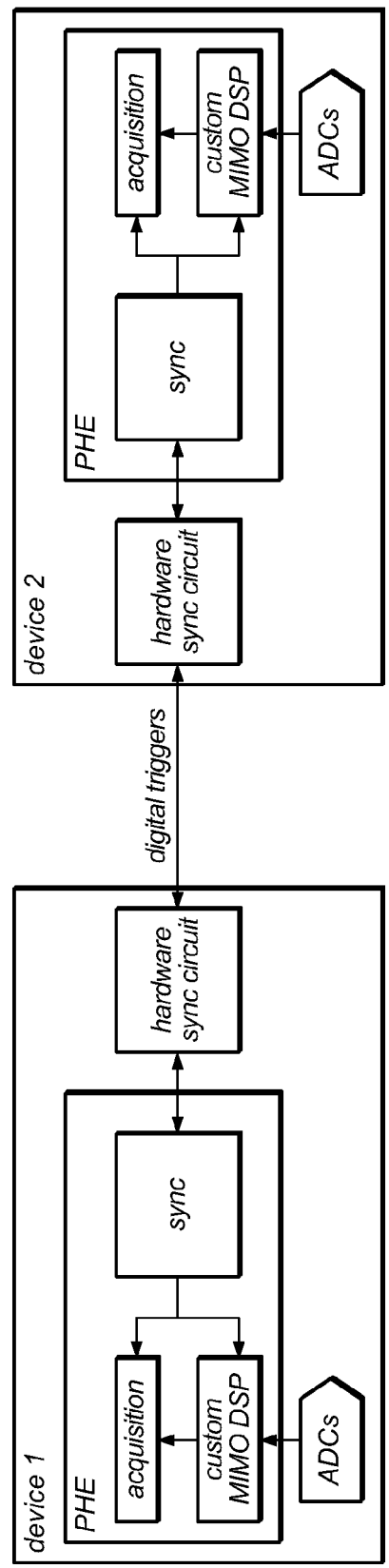
FIGS. 9-12B are exemplary block diagrams and graphical programs that may utilize the method of FIG. 8.
Figure 10A:
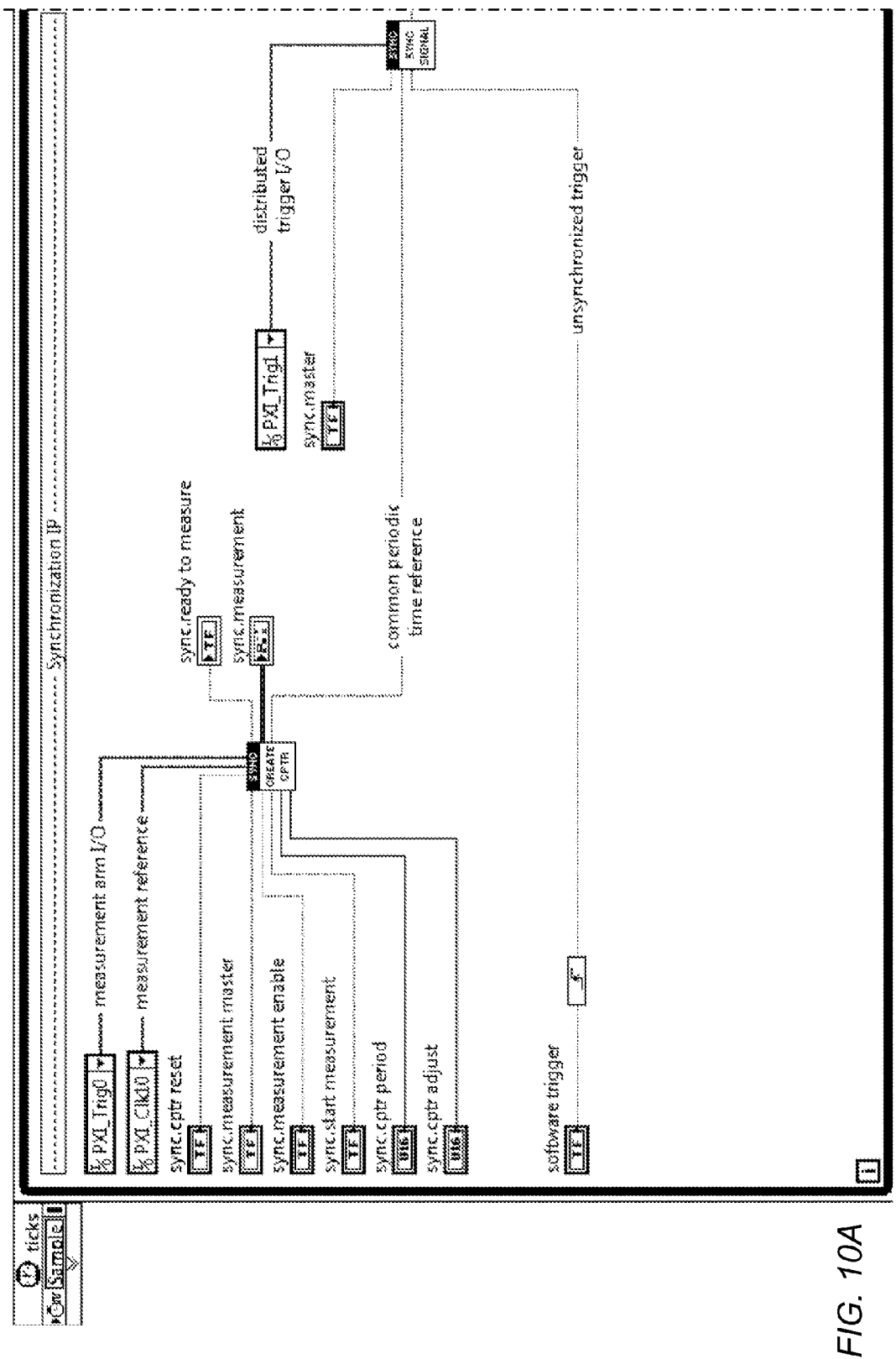
Figure 10B:
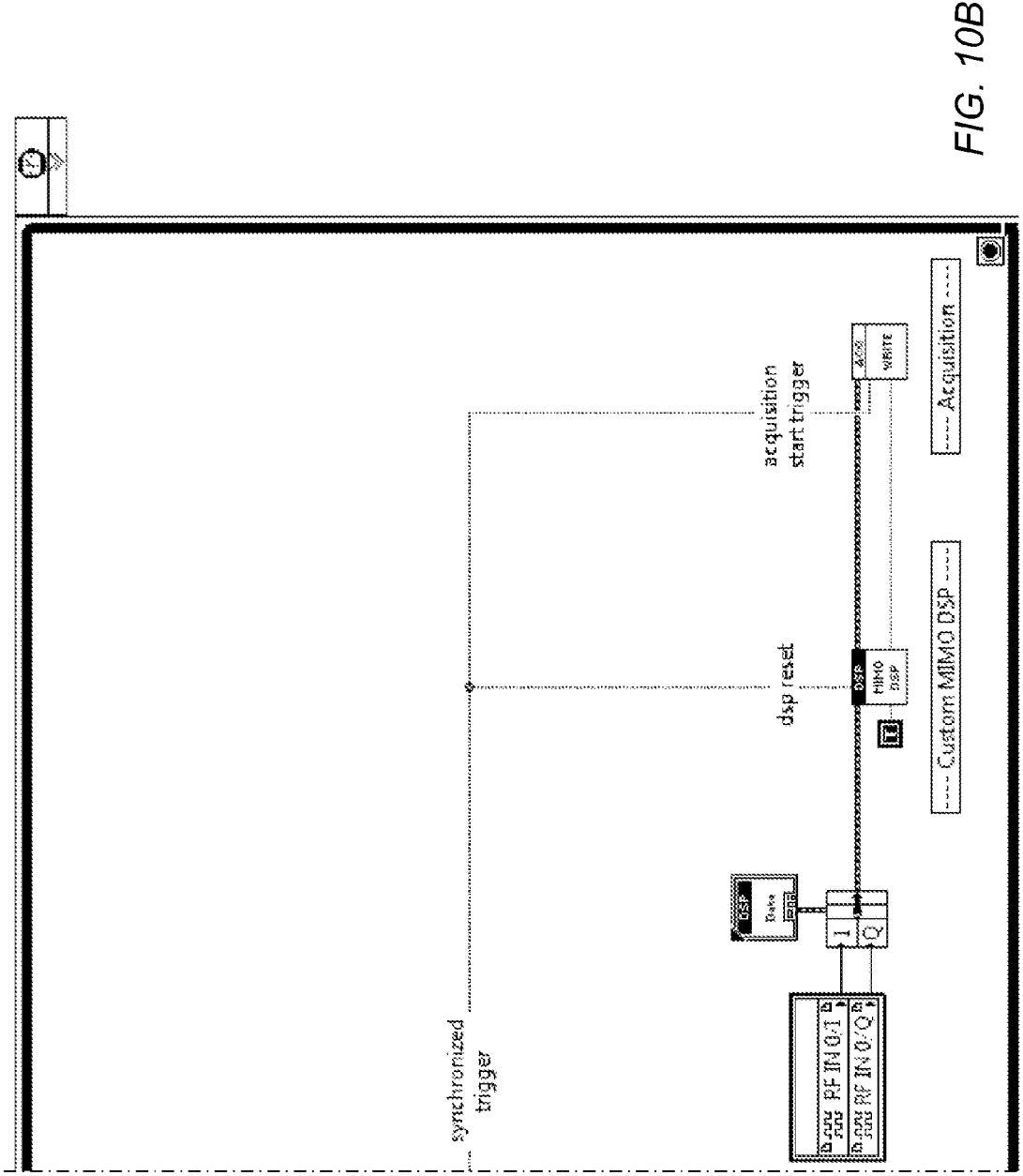

FIGS. 9-10B—First Example Using an Embodiment of the Method of FIG. 8

FIGS. 9-10B provide an example using an embodiment of the method of FIG. 8. More specifically, FIG. 9 presents an example of how a user might synchronize custom code in a MIMO application. For example, the user might be a signal processing expert designing a new MIMO algorithm. In this example, the user has selected a synchronization module that uses a PXI trigger bus to synchronize two devices. While the user could have selected a pre-defined acquisition module, he has elected to write his own MIMO DSP code, shown in the Figure.

In this example, when the application starts, it may be important that the acquisition engines on each instrument start acquiring at precisely the same time. It may also be important that the MIMO DSP have the same phase relationship on each device. The user can use the standard interface of the synchronization module to synchronize acquisition start as well as MIMO DSP phase alignment on both instruments.

FIGS. 10A and 10B illustrate the underlying graphical code that may implement the functionality shown in FIG. 9.

Figure 11:
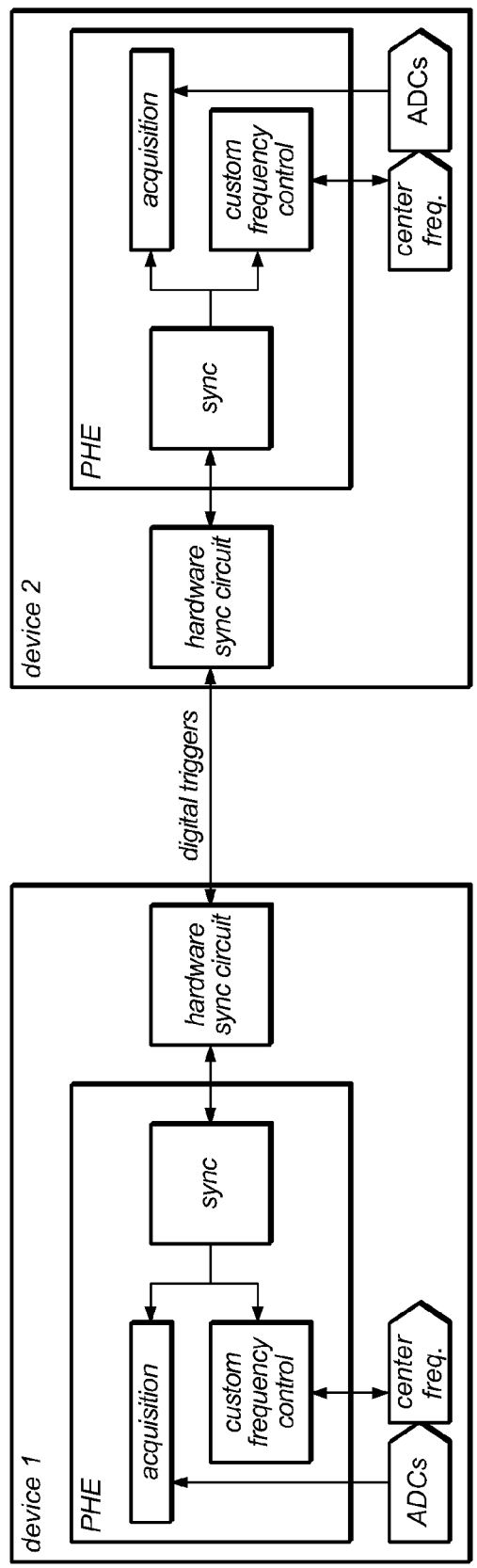
Figure 12A:
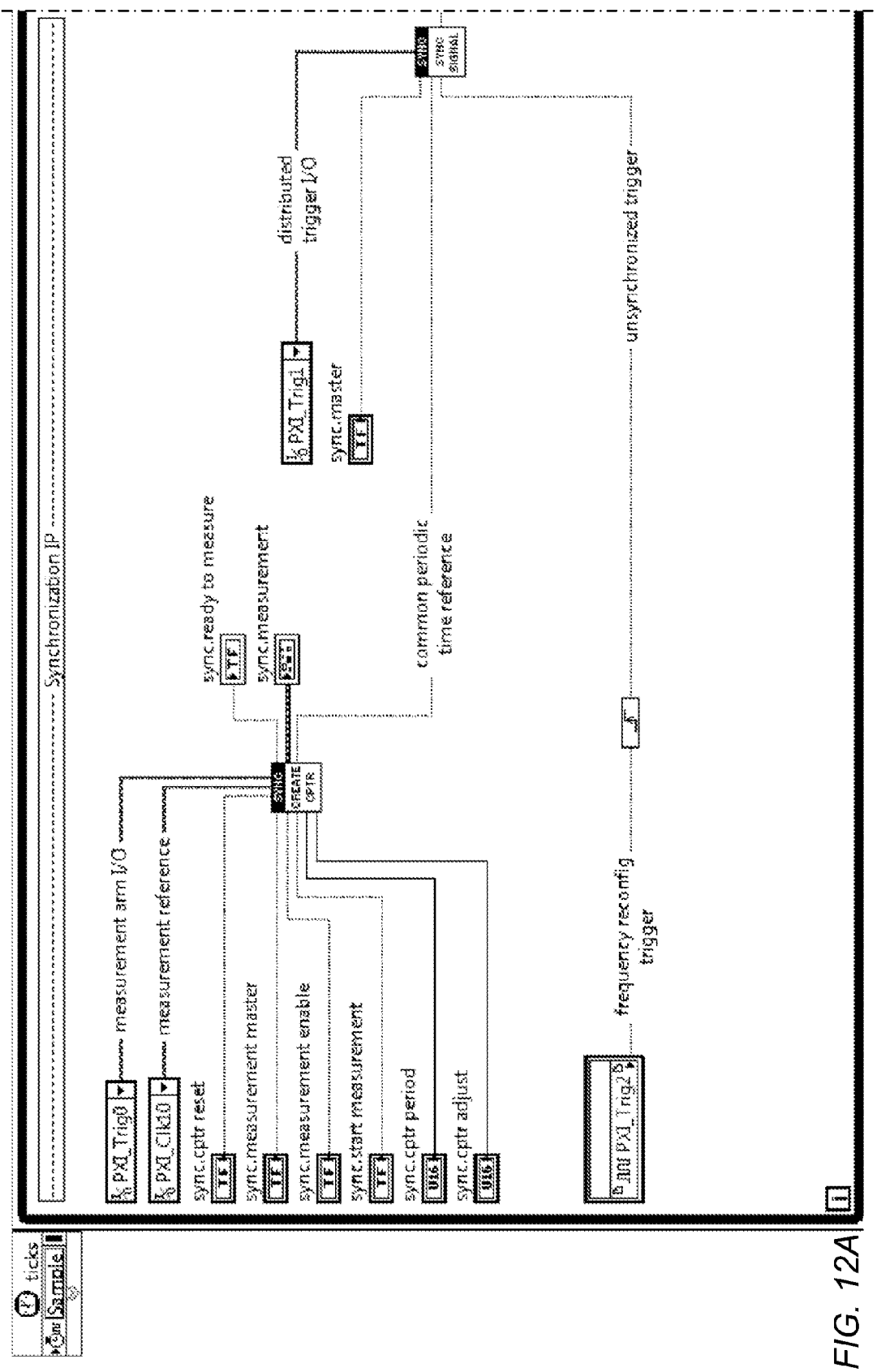
Figure 12B:
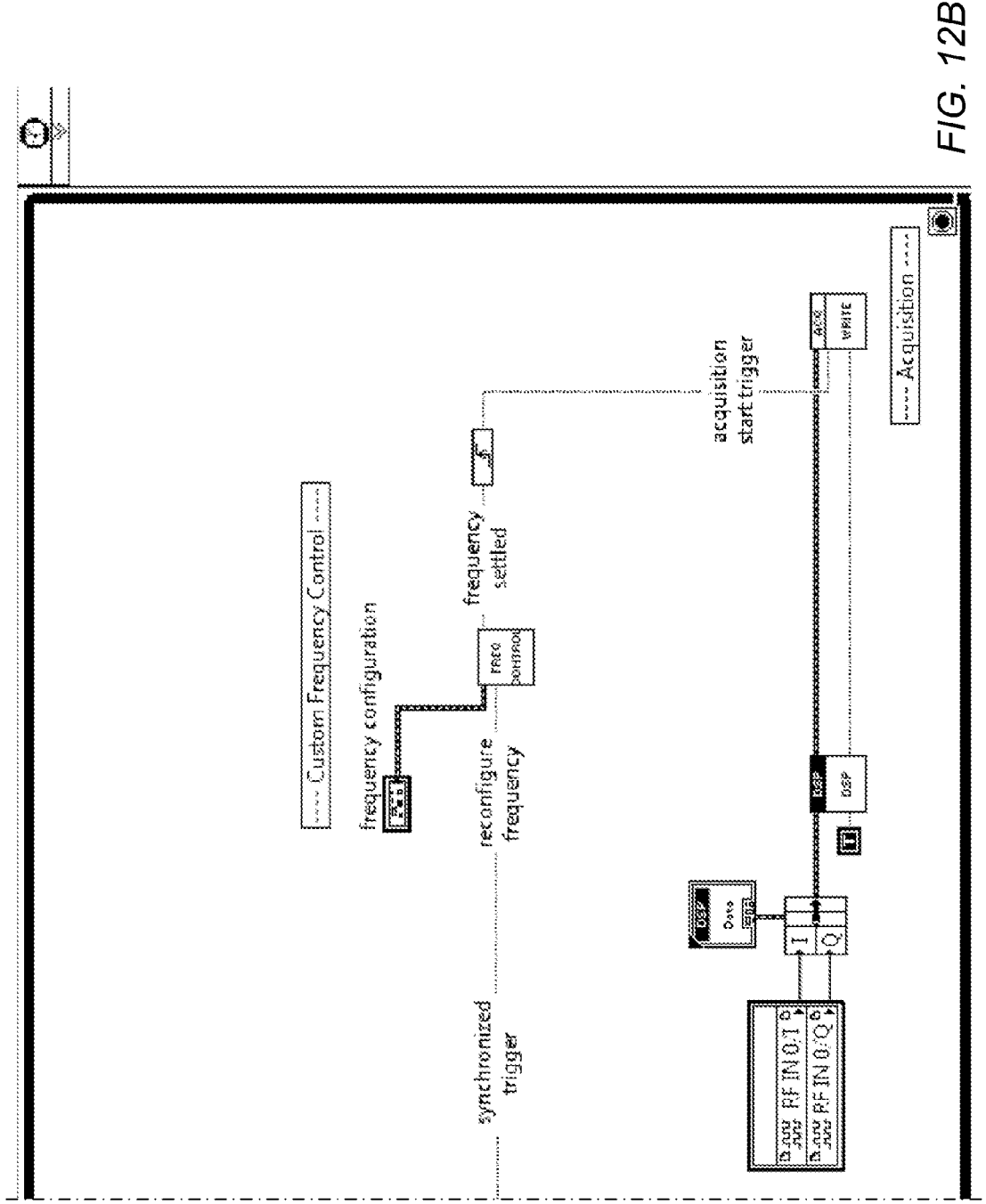

FIGS. 11-12B—Second Example Using an Embodiment of the Method of FIG. 8

FIGS. 11-12B provide an example using an embodiment of the method of FIG. 8. More specifically, FIG. 11 presents an example where a user may desire to precisely synchronize the capture of data at different RF center frequencies. The user may specify a custom frequency control algorithm running on each device that makes on-the-fly decisions about how to configure the center frequency of the instrument. The user can use the same synchronization module to synchronize both data capture and frequency control operations on the instrument. The user can also precisely control when the synchronized frequency control happens relative to the acquisition. For example, the user might want to reconfigure the center frequency on each instrument slightly before acquiring the data.

FIGS. 12A and 12B illustrate the underlying graphical code that may implement the functionality shown in FIG. 11.

Figure 13:
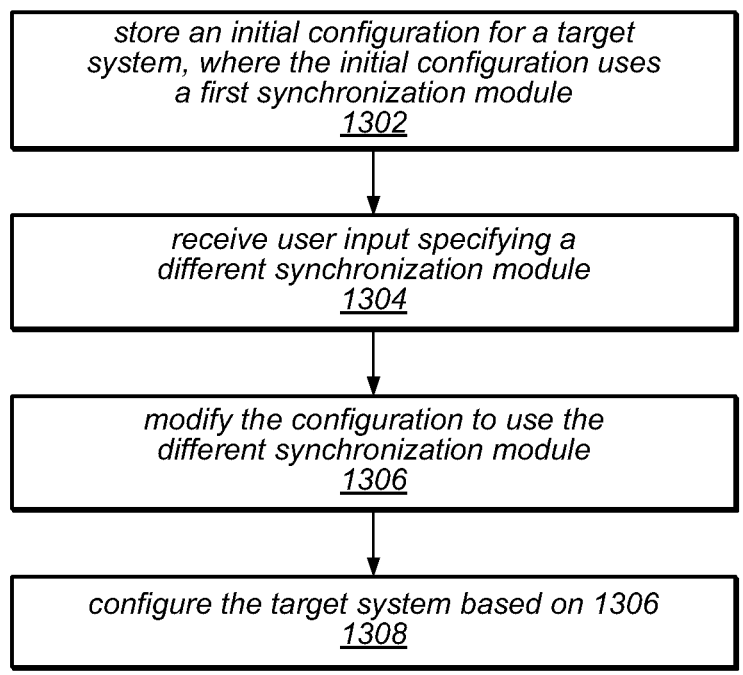
FIG. 13 is a flowchart diagram illustrating one embodiment of a method for modifying a target system configuration to utilize a different synchronization module.

FIG. 13—Modifying a Target System Configuration to Use a Different Synchronization Method FIG. 13 illustrates a method for modifying a target system configuration to use a different synchronization module. The method shown in FIG. 13 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 1302, an initial program or configuration for a target system may be specified or stored. For example, the initial program or configuration may be specified in the manner specified in FIG. 8. This configuration may include a first synchronization module and code for a first device of the target system and a second synchronization module and code for a second device of the target system.

The first and second synchronization modules may be configured for using a specific type of synchronization or for performing synchronization over a particular interconnect (or a set of compatible interconnects).

In 1304, user input may be received specifying a different synchronization module. For example, the user input may specify use of a synchronization module for a different type of interconnect or for performing the synchronization in a different manner. In one embodiment, the user may manually remove the first and second synchronization modules and replace them with another pair of synchronization modules that implement the desired, different synchronization method or interconnect.

However, more automatic embodiments are also envisioned. For example, the user may replace only one of the synchronization modules and the other may be automatically updated. As another possibility, the user may use a GUI or wizard to specify a different interconnect or synchronization method and the modules may be automatically replaced in response to use of the GUI or wizard. Even further, where the target platform is detectable or may be communicated with, a change in configuration may be detected (e.g., a change in the type of interconnects available may be detected) and the configuration or program may be updated to use the different set of synchronization modules automatically, without user input manually selecting the new set of synchronization modules. Alternatively, the interconnect may simply be changed for the first and second synchronization modules without replacing them with other synchronization modules.

Accordingly, in 1306, the program or configuration may be modified based on the user input in 1304. As discussed above, the modification may be performed manually or automatically, as desired. Thus, the modified program or configuration may utilize a new synchronization module corresponding to a different synchronization interconnect or method.

Note that because the synchronization modules use a standard interface, the other portions of the configuration or program (e.g., the user code or other modules of the program) may not need to be modified. Thus, the standard interface may remain the same, even though a different synchronization method or interconnect is specified. Thus, where there is user-created code, there may be no requirement to modify the user-created code (e.g., other than possibly referencing the new synchronization module) because the two synchronization modules use the same standard interface.

In 1308, the target system may be configured based on the modified program or configuration of 1306. The configuration may be performed in the manner described above in 808.

FIGS. 14-17B—Example Using an Embodiment of the Method of FIG. 13

Figure 14:
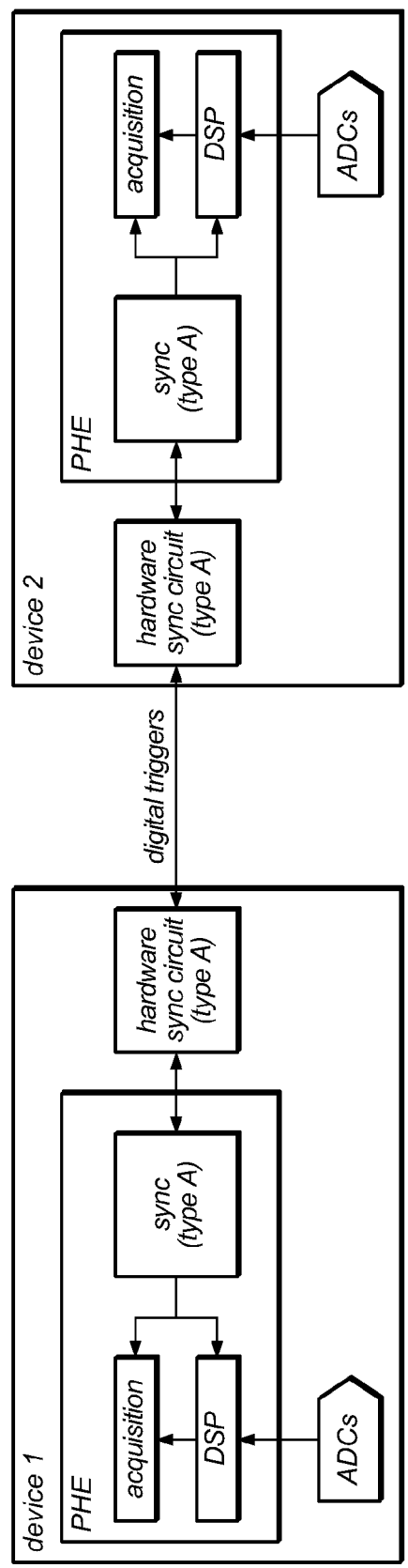
FIGS. 14-17B are exemplary block diagrams and graphical programs that may utilize the method of FIG. 13.

FIGS. 14-17B provide an example using an embodiment of the method of FIG. 13. More specifically, FIG. 14 presents an example of using a synchronization block to synchronize the capture of acoustic measurements. More specifically, these devices may be connected to various microphones that are attached to various points of interest. On a small scale, a simple digital trigger bus might be a sufficient synchronization interconnect. However, if the application evolves to require a much larger physical separation of the devices, the digital trigger bus may not be capable enough. Thus, in the example of FIG. 14, the user specifies a first interconnect type, using synchronization modules of type A along with underlying hardware of type A.

Figure 15:
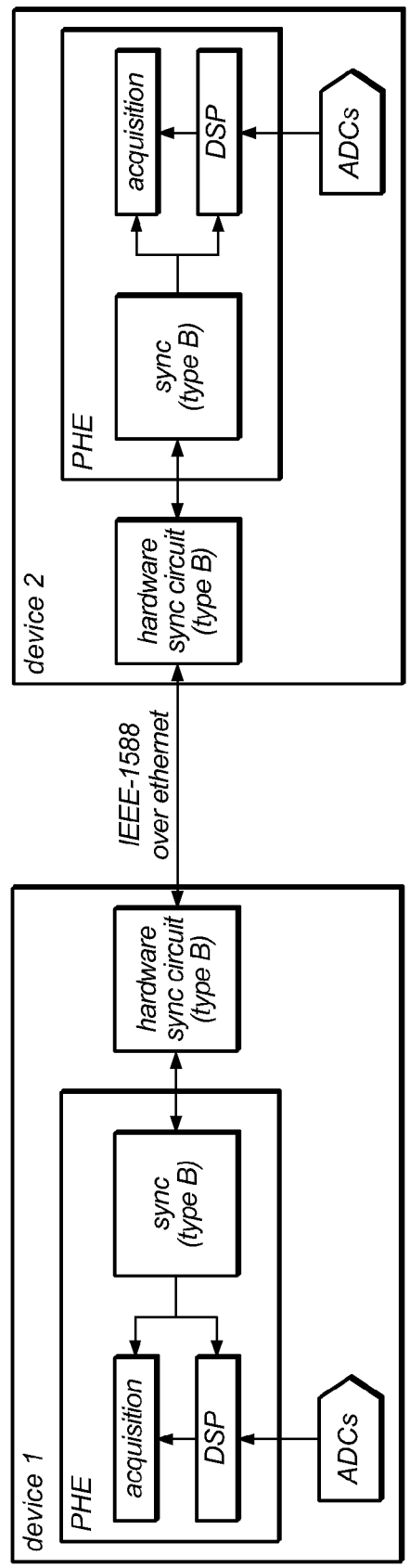

However, in the example of FIG. 15, the designer might replace the digital trigger bus with an Ethernet link running IEEE-1588. This may allow the devices to achieve very precise synchronization over much larger distances. Accordingly, the user may replace the synchronization module of type A with a different synchronization module of type B that supports IEEE-1588. After making this change, the standard interface to the acquisition and DSP code remains the same. Therefore, the user does not need to modify their acquisition or DSP code to take advantage of this new synchronization interconnect.

Figure 16A:
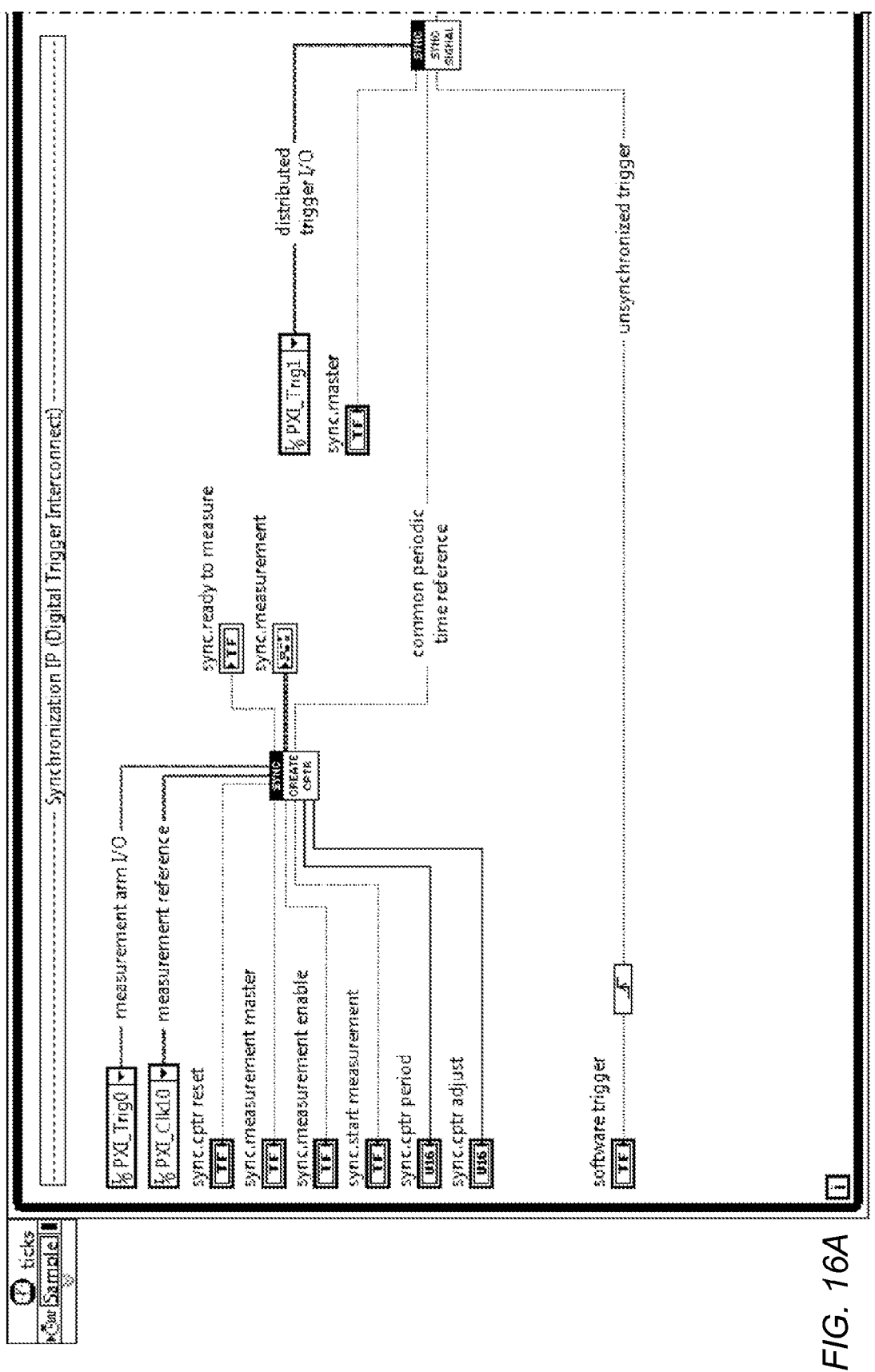
Figure 16B:
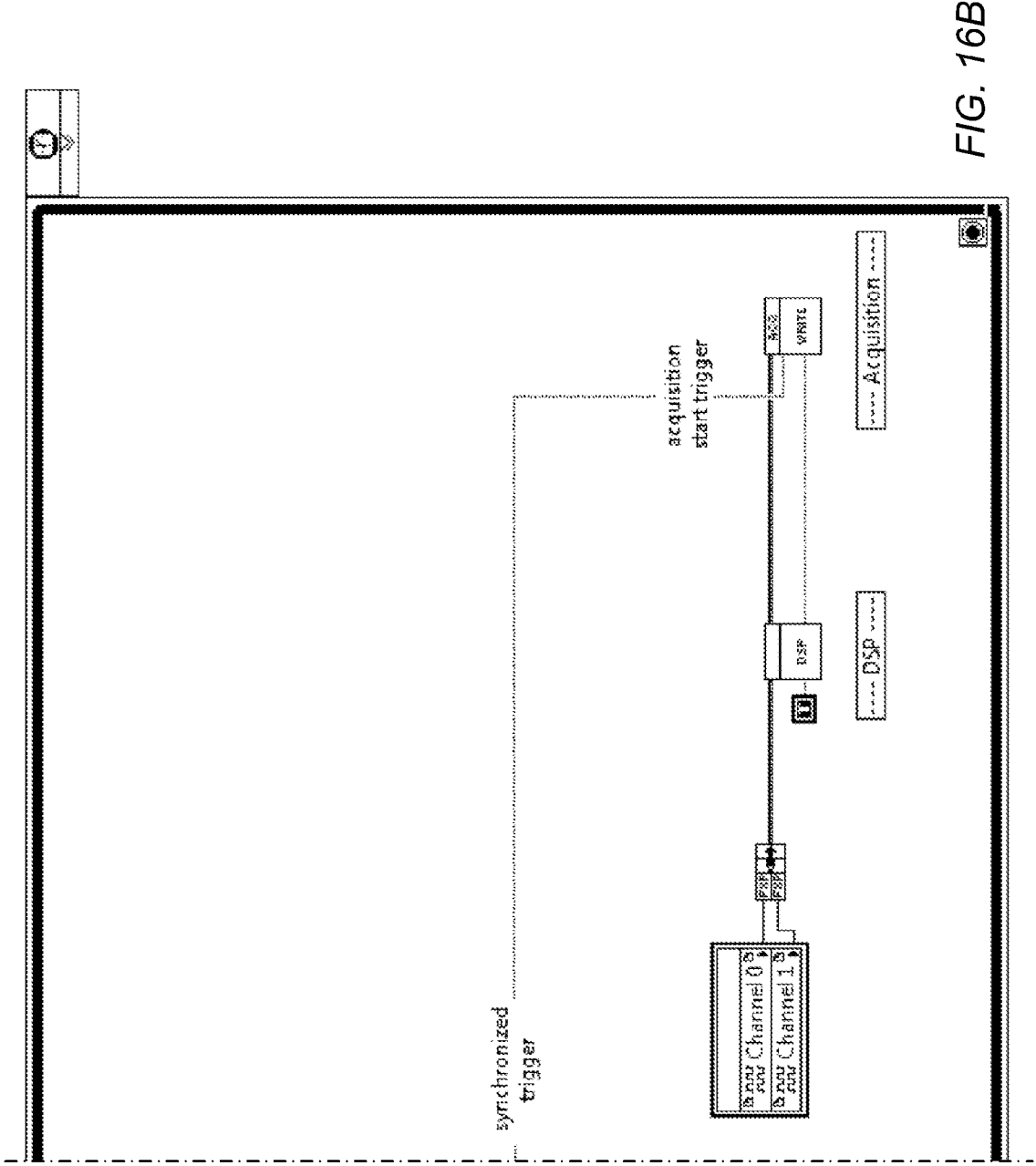
Figure 17A:
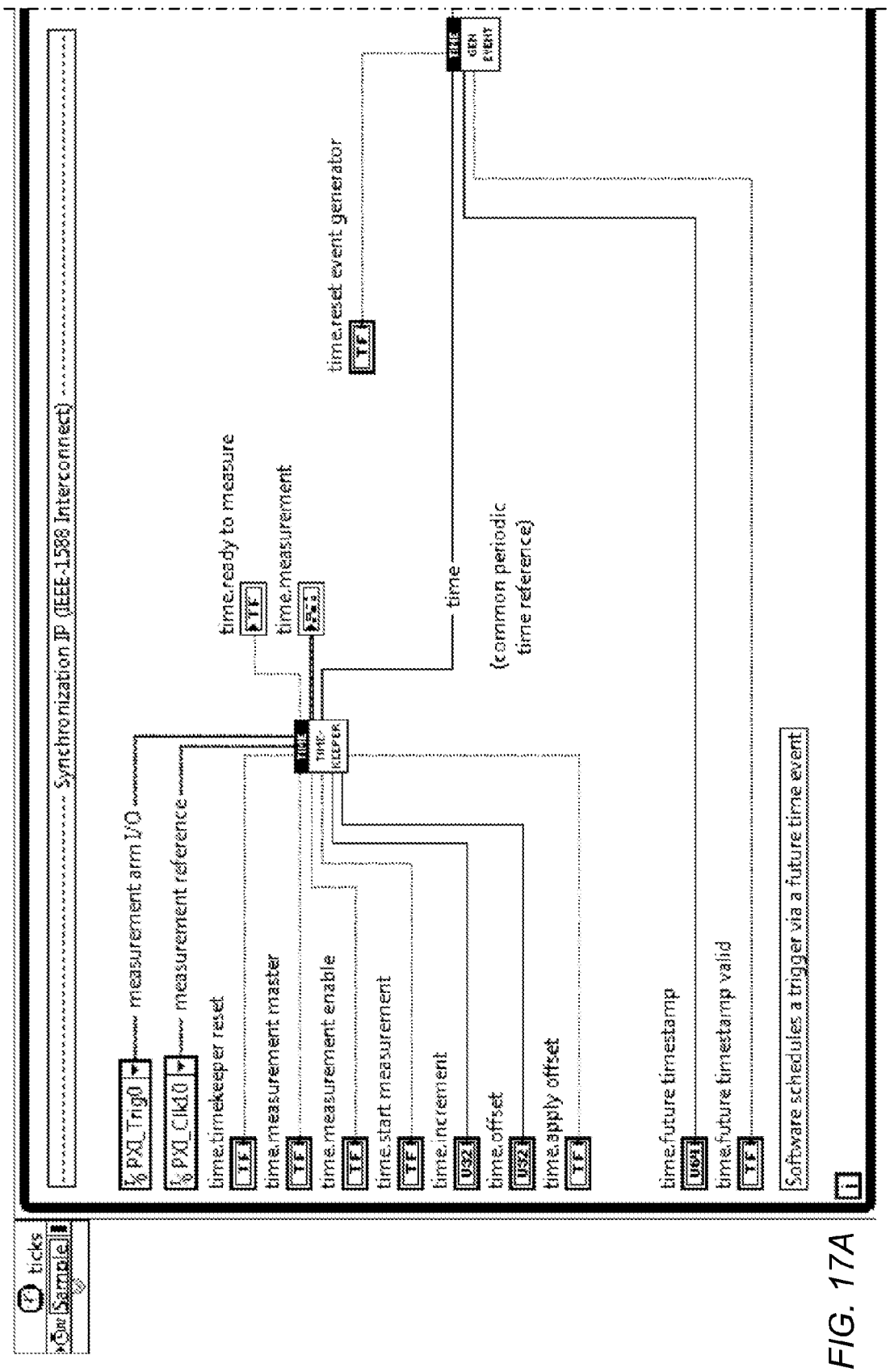
Figure 17B:
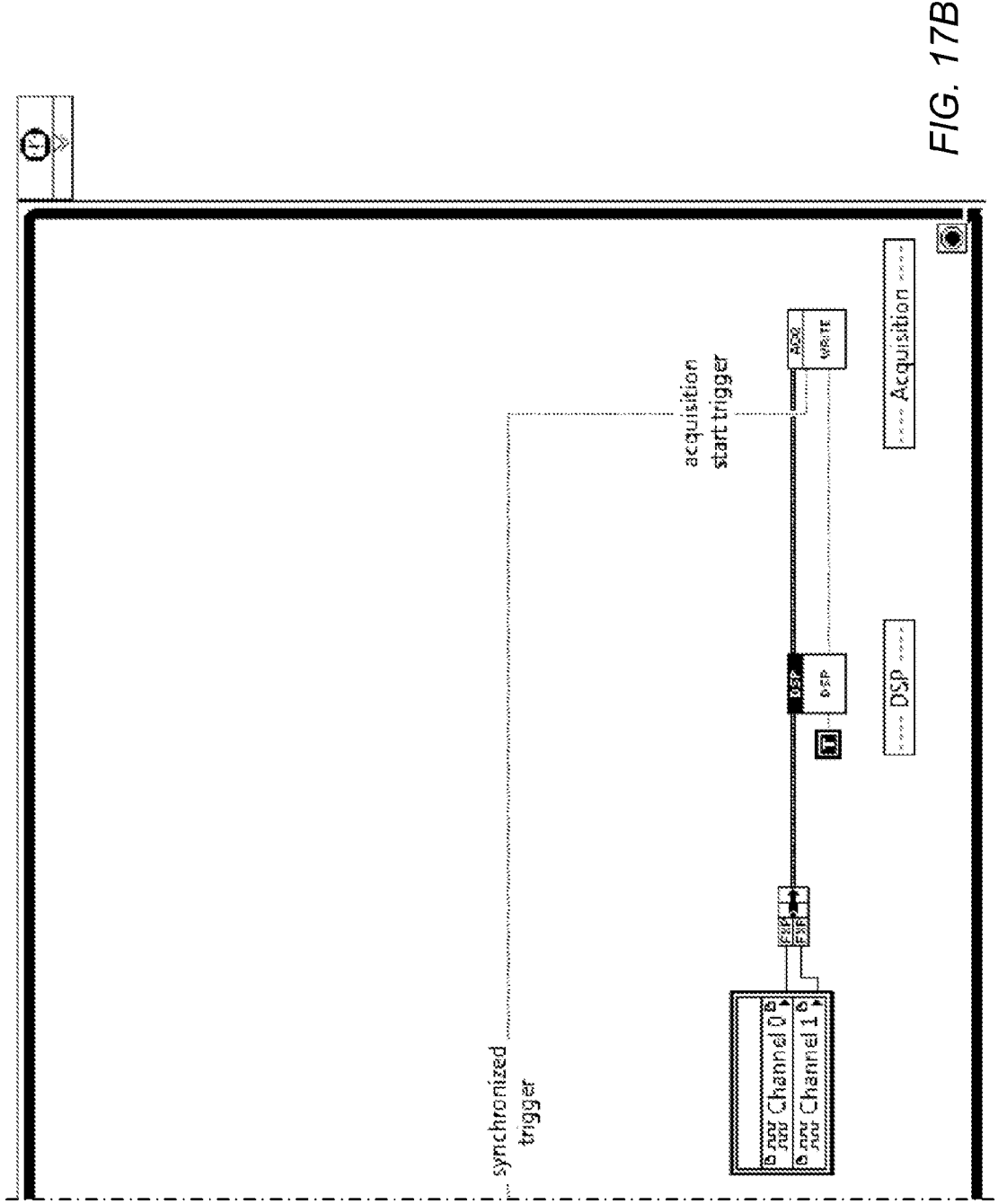

FIGS. 16A and 16B illustrate the underlying graphical code that may implement the functionality shown in FIG. 14, and FIGS. 17A and 17B illustrate the underlying graphical code that may implement the functionality shown in FIG. 15.

Figure 18:
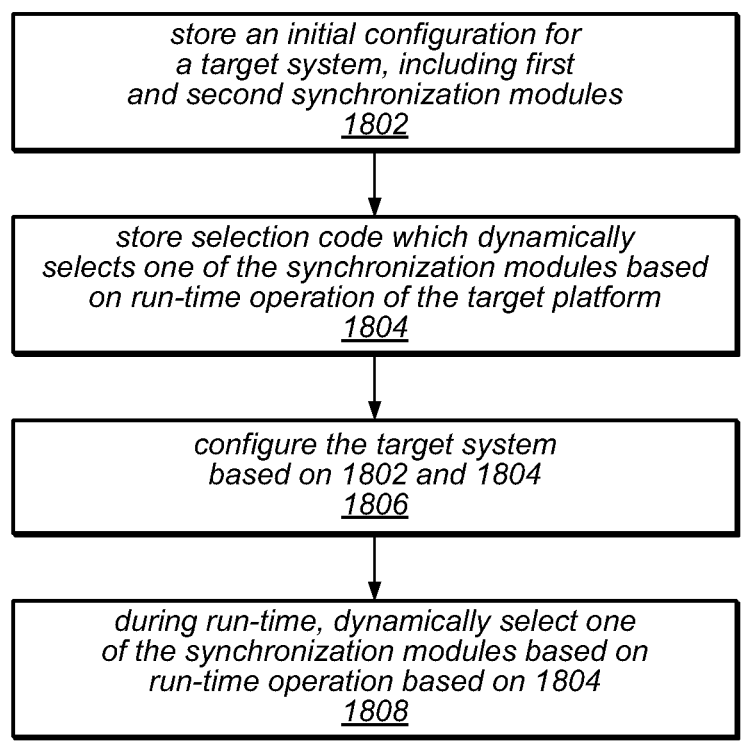
FIG. 18 is a flowchart diagram illustrating one embodiment of a method for performing dynamic synchronization in a target system.

FIG. 18—Dynamic Synchronization in a Target System

FIG. 18 illustrates a method for configuring dynamic synchronization in a target system. The method shown in FIG. 18 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

1802, store an initial configuration for a target system, including first and second types of synchronization modules. For example, the initial program or configuration may be specified in a manner similar to the one specified in FIG. 8. However, the configuration may include a plurality of synchronization modules of the first type and a plurality of synchronization modules of the second type. As one specific example, the configuration may include a first synchronization module of the first type, a first synchronization module of the second type, and first code that utilizes the two synchronization modules for a first device of the target system. Similarly, the configuration may include a second synchronization module of the first type, a second synchronization module of the second type, and second code that utilizes the two synchronization modules for a second device of the target system.

Similar to embodiments discussed above, these synchronization modules may have been selected by the user or automatically as desired. The different types of synchronization modules may be used in target systems which are have more than one possible interconnect and/or are able to perform more than one type of synchronization method. For example, the target system may support communication between the two devices using an Ethernet interconnect as well as a wireless interconnect. Accordingly, the configuration may include both types of synchronization modules in order to support the two different types of interconnects. Similarly, different synchronization modules may be used for different types of synchronizations, as desired.

In 1804, selection code which dynamically selects one of the synchronization modules based on run-time operation of the target platform may be stored. For example, user input may be received which specifies user-created code which performs the selection, e.g., where the user manually creates the code that will perform the selection. Alternatively, or additionally, the selection code may be automatically generated. For example, the user may provide input to a GUI or series of GUIs (e.g., a wizard) which allows the user to specify which characteristics to perform the selection based on. Accordingly, code that dynamically makes the selection at run-time may be automatically generated in response to the user input, without the user manually specifying the underlying code.

The selection code may operate in a variety of manners. For example, the selection code may be configured to perform a test synchronization using the available specified synchronizations (e.g., using the different methods and/or interconnects specified by the types of synchronization modules). The selection code may then select the synchronization which performed according to criteria, e.g., which may be pre-defined or supplied by the user. For example, the synchronization that was fastest may be desirable in a first scenario while the synchronization which provided the tightest synchronization may be desirable in a second scenario. Any of a number of characteristics may be used to determine the appropriate synchronization to use at run-time.

In another embodiment, the selection may be based on the interconnects that are available (e.g., based on detection of available interconnects), reported backpressure (e.g., selecting the least busy interconnect), quality of service, packet loss, type of connected SUT, interference, etc. Any number of conditions, e.g., of the target system or elsewhere, may be considered in performing the selection. Thus, the selection code may be configured to perform dynamic selection of the type of synchronization at run-time, e.g., either using the first type of synchronization or the second type of synchronization discussed above.

In 1806, the target system may be configured based on the synchronization modules, the first and second code, and the selection code, based on 1802 and 1804 above. The configuration may be performed in a manner similar to the one described above in 808.

In 1808, during operation, the target system may dynamically select one of the synchronization types according to the functionality specified by the selection code in 1804 above.

While the above description has focused on only two devices and two types of synchronization types or modules, any number of devices and synchronization modules or types may be used. Thus, the above-method may be easily extended to a plurality of devices and a plurality of synchronization modules.

Figure 19:
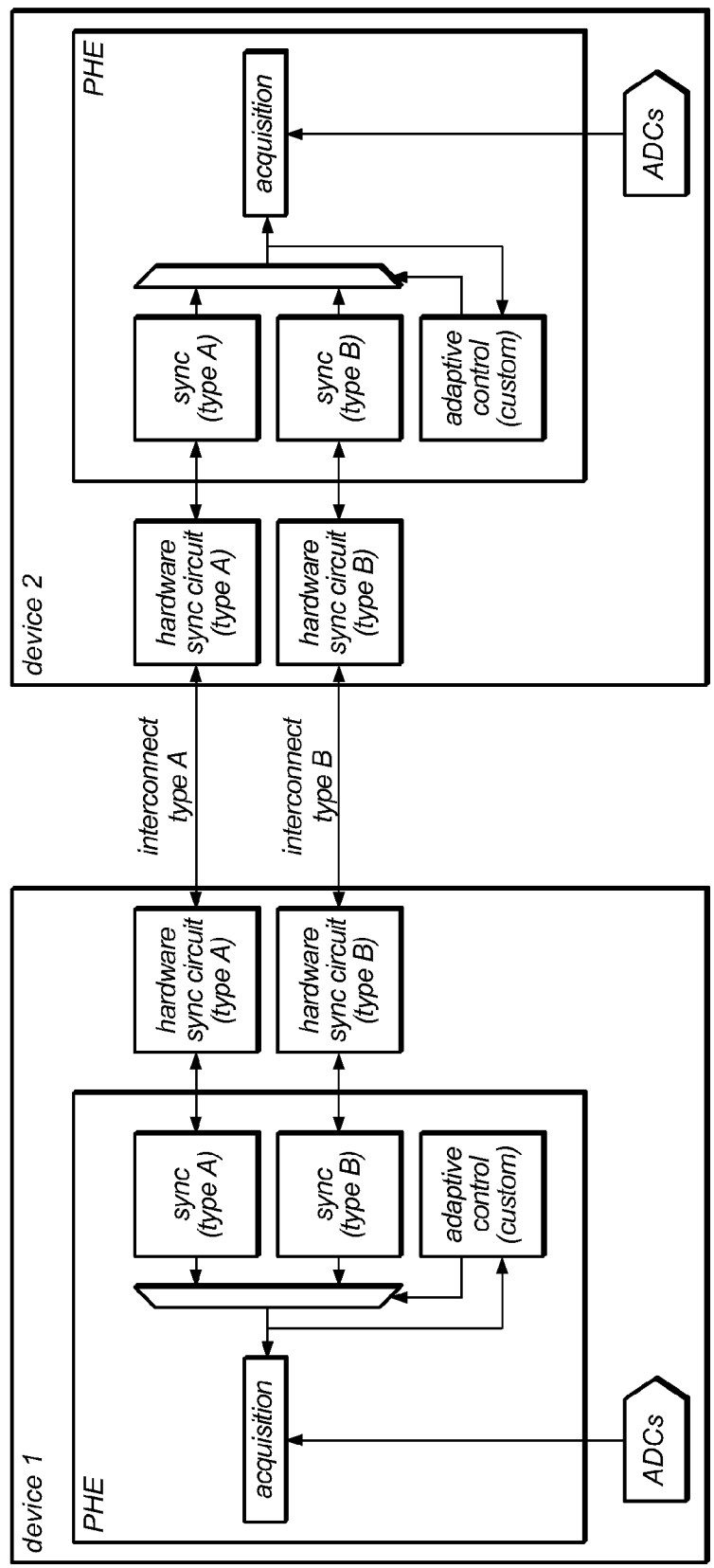
FIGS. 19-22D are exemplary block diagrams and graphical programs that may utilize the method of FIG. 18.
Figure 20A:
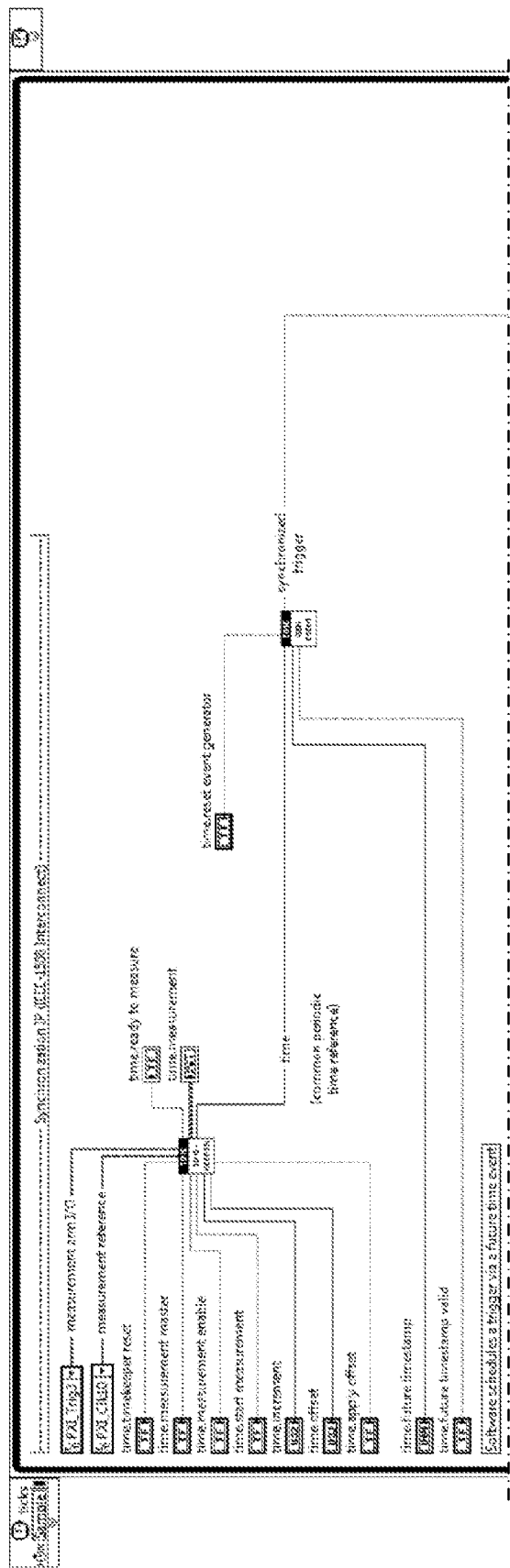
Figure 20B:
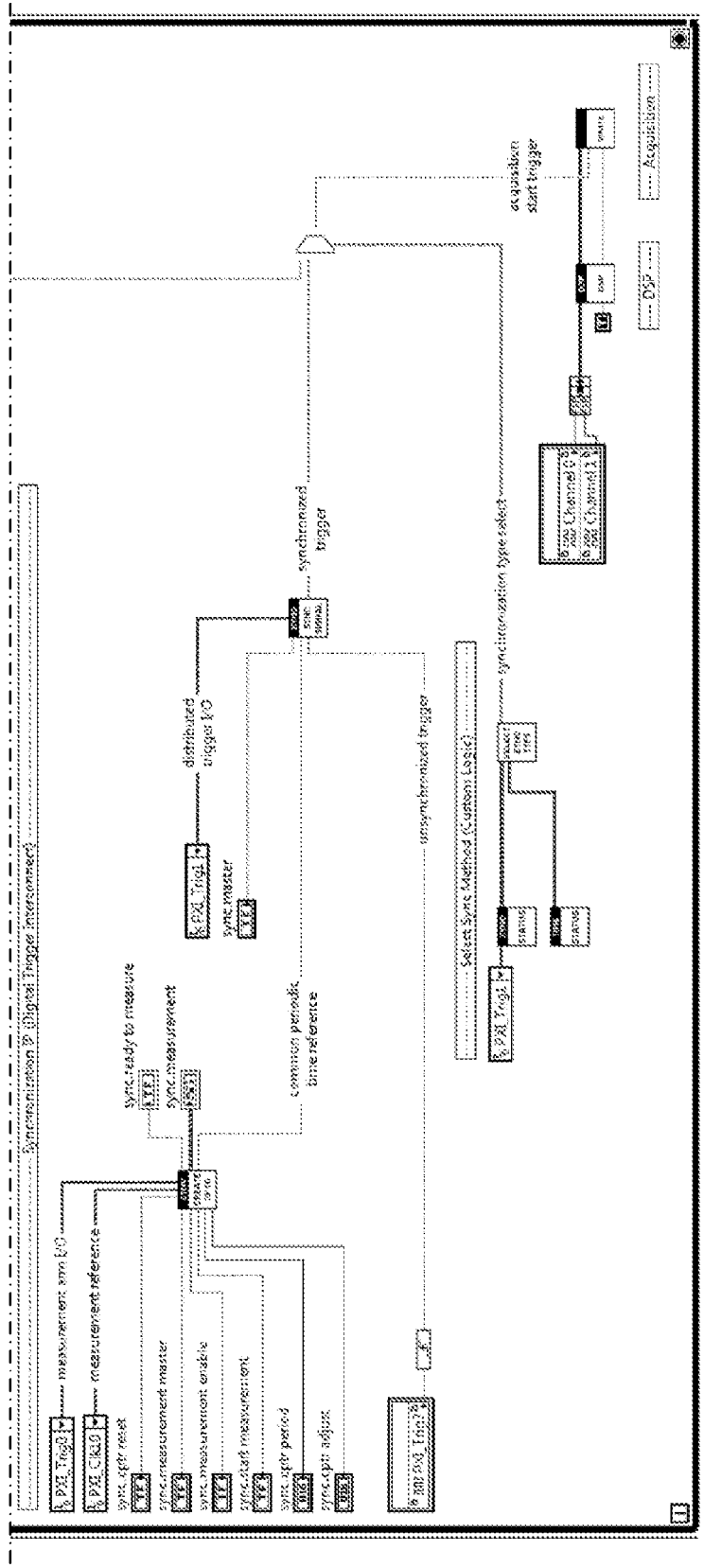

FIGS. 19-20B—Example Using an Embodiment of the Method of FIG. 18

FIGS. 19-20B provide an example using an embodiment of the method of FIG. 18. More specifically, FIG. 19 presents an example where some applications might need to adaptively select the best synchronization method during operation. The user has the ability to add two or more different synchronization blocks to his device. Then, the user can design custom selection code to intelligently choose which synchronization block to use at any give time. The synchronization blocks might use entirely different synchronization interconnects or types of synchronizations, as desired.

As shown in FIG. 19, there may be two different synchronization interconnects as well as two different types of synchronization modules. The adaptive control block may select the desired synchronization type during run-time.

FIGS. 20A and 20B illustrate the underlying graphical code that may implement the functionality shown in FIG. 19.

Figure 21:
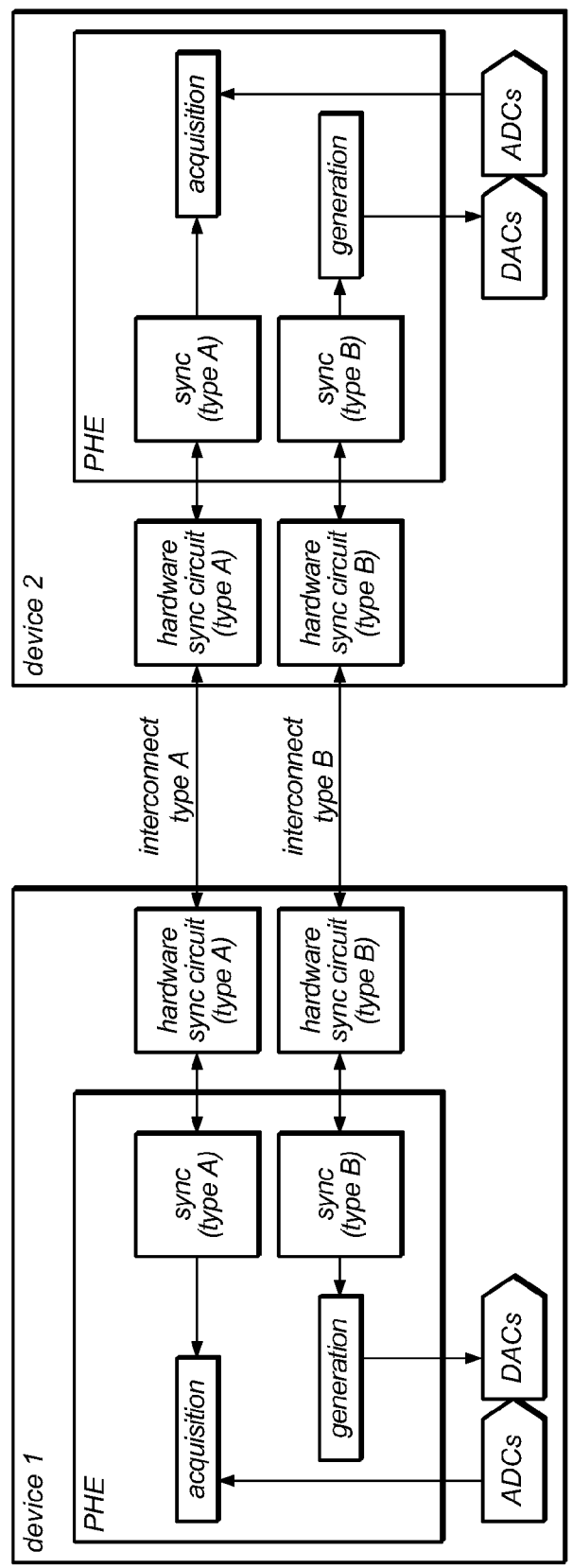
Figure 22A:
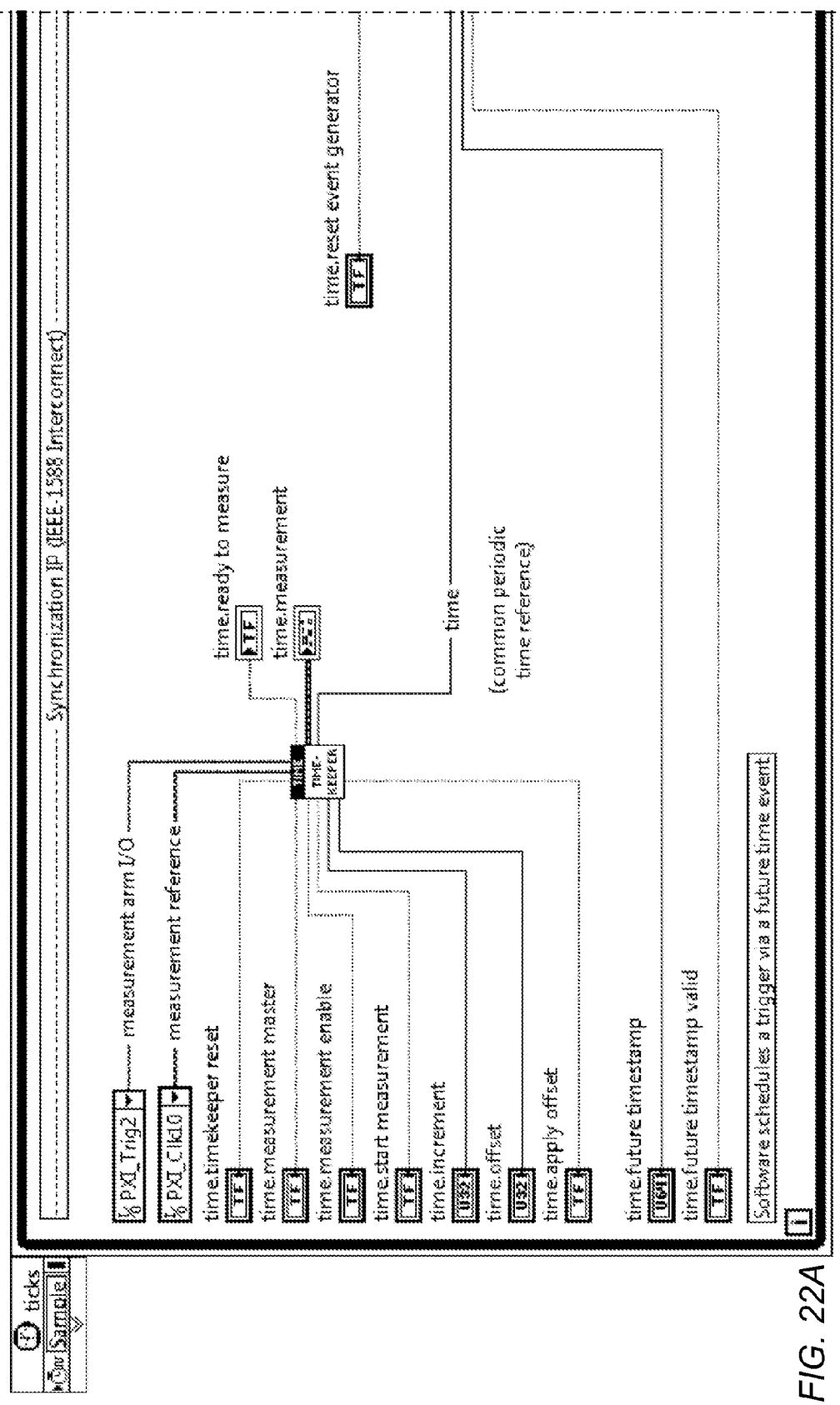
Figure 22B:
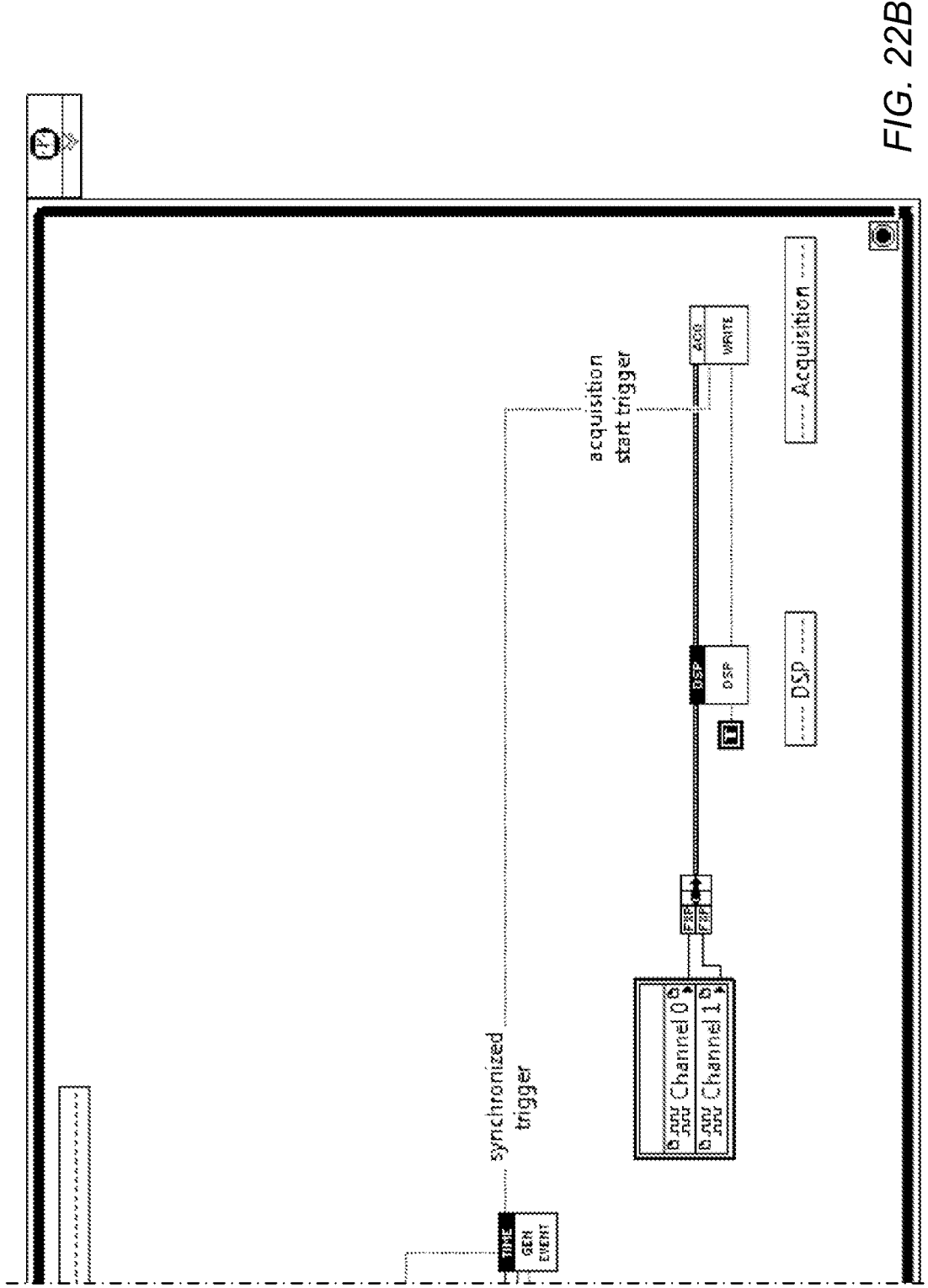
Figure 22C:
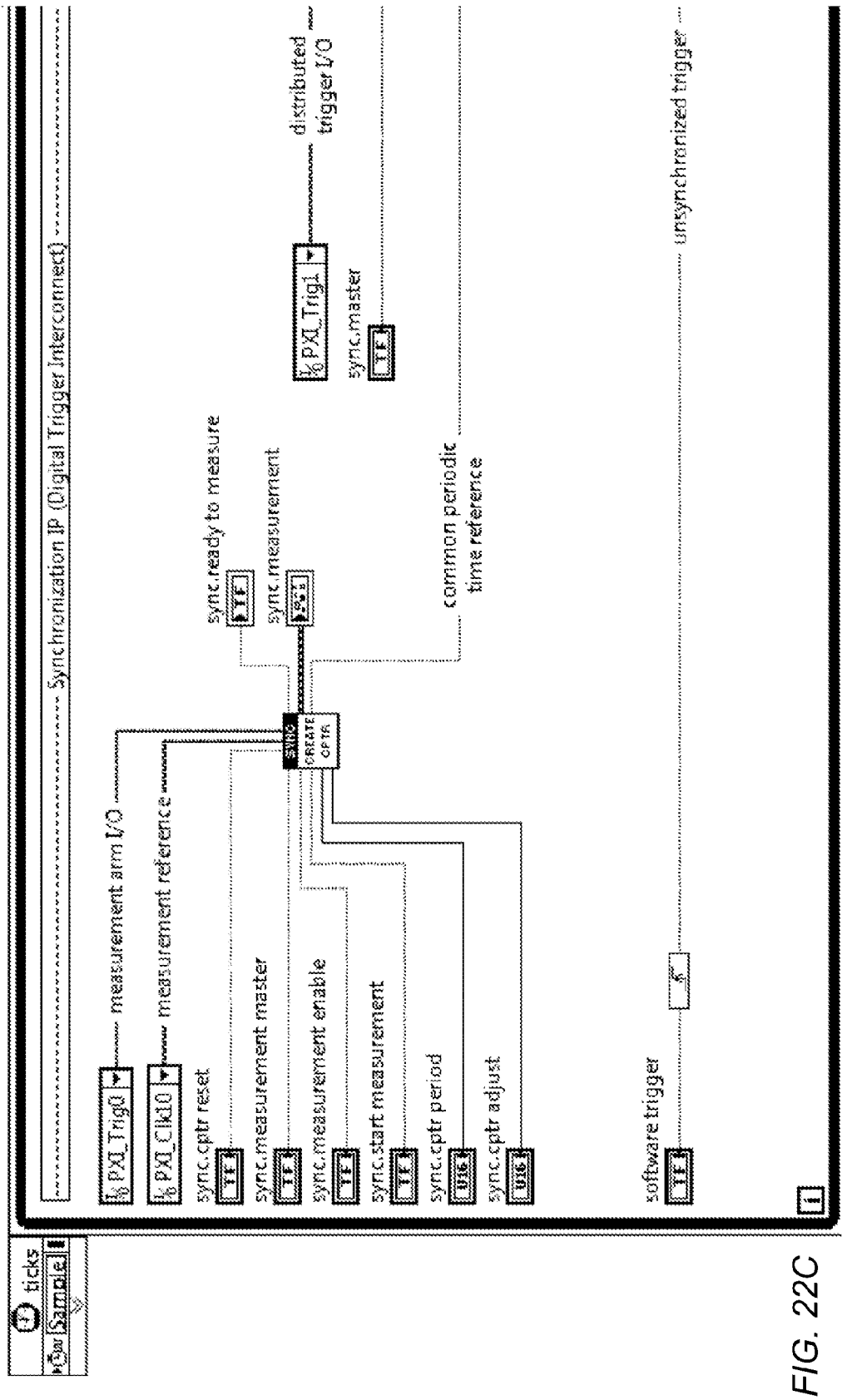
Figure 22D:
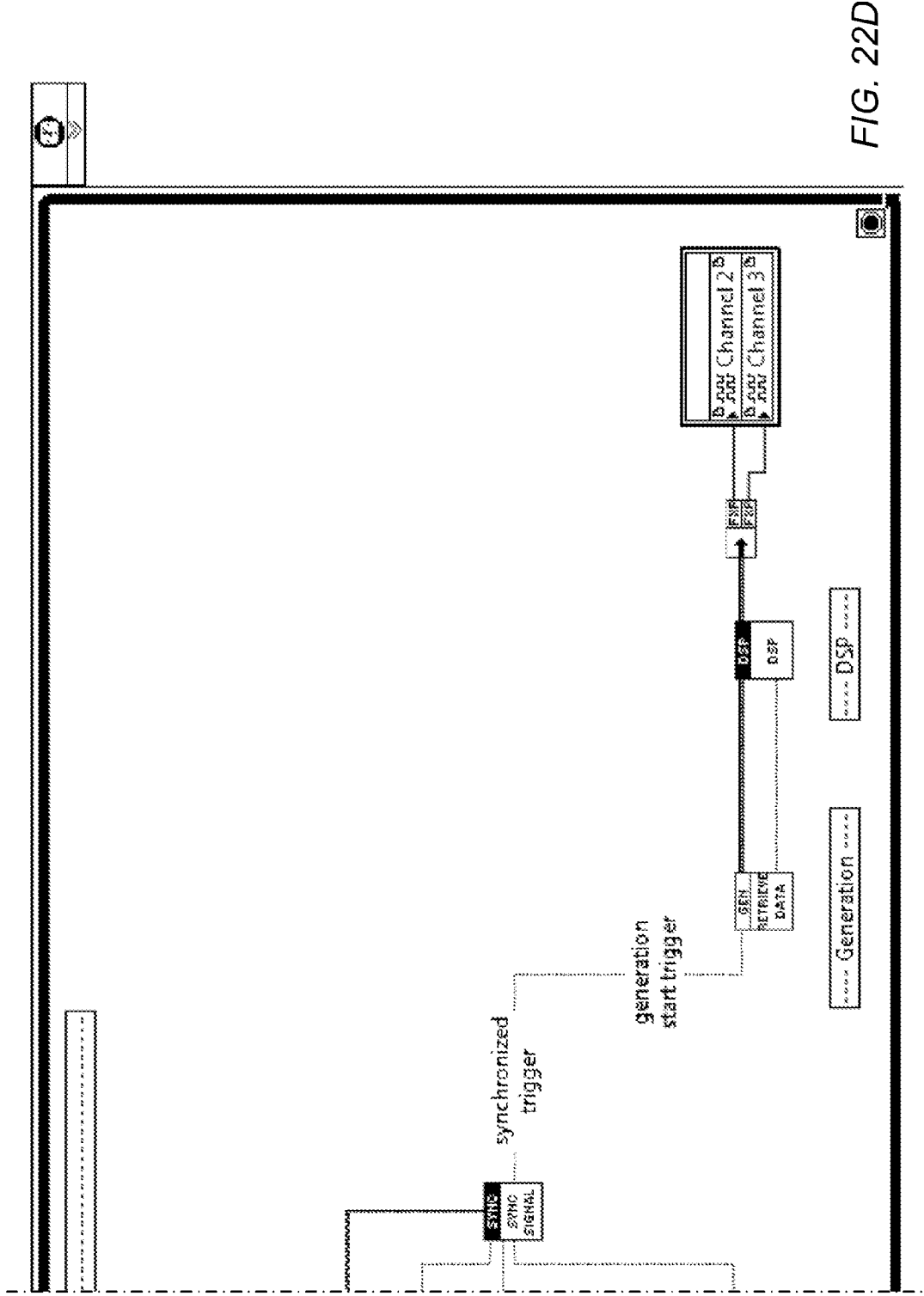

FIGS. 21-22D—Using a Plurality of Synchronization Interconnects

FIGS. 21-22D provide an example where multiple synchronization interconnects are used in a target system. More specifically, as shown in FIG. 21, a user could also elect to use multiple different synchronization methods simultaneously for independent operations. In this case, the acquisition modules are synchronized completely independently from the generation modules.

FIGS. 22A-22D illustrate the underlying graphical code that may implement the functionality shown in FIG. 21.

Further Embodiments

While the above embodiments have been primarily described with respect to test instruments and testing SUTs, they may be extended to configuration or customization of any devices or instruments. For example, embodiments described herein may apply to any target system, e.g., which is desired to perform synchronization between multiple devices. Thus, the above described embodiments are not limited to the particular environments and examples discussed above and may be applied to any appropriate systems, as desired.

Additionally, while many of the embodiments described above relate to the use of synchronization modules by custom or user-created code, these embodiments may also be used with third party IP blocks or built-in code, as desired.

Finally, while many of the embodiments discussed above relate to "measurement devices", these embodiments may also be extended to other types of devices, e.g., those that do not include measurement or physical I/O.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for modifying a program for a target system, wherein the target system comprises a first device with a first programmable hardware element (PHE), comprising:

storing a first program for implementation on the first PHE of the first device, wherein the first program comprises:

1) a first synchronization module having code for implementation on the first PHE of the first device, wherein the first synchronization module provides a standard interface for interacting with other code; and 2) first user-created code which performs a first function;

wherein the first synchronization module is configured to adjust timing of the first user-created code in the first program according to a first type of synchronization;

receiving user input specifying use of a second type of synchronization to synchronize the first user-created code;

replacing the first synchronization module with a second synchronization module in response to the user input, wherein the second synchronization module is configured to adjust timing of the first user-created code in the first program according to the second type of synchronization, wherein the second synchronization module provides the standard interface for interacting with other code, and wherein the first user-created code does not require modification in response to said replacing the first synchronization module;

generating a hardware description for the first PHE based on the second synchronization module and the first user-created code; and configuring the first PHE according to the hardware description, wherein during operation, the first PHE is configured to adjust timing of the first user-created code according to the second synchronization module.

2. The method of claim 1, wherein the target system comprises a second device having a second PHE, wherein the method further comprises:

storing a second program for implementation on the second PHE of the second device, wherein the second program comprises:

1) a third synchronization module having code for implementation on the second PHE of the second device, wherein the third synchronization module provides the standard interface for interacting with other code; and 2) second user-created code which performs a second function;

wherein the third synchronization module is configured to adjust timing of the second user-created code in the second program according to the first type of synchronization;

receiving user input specifying use of the second type of synchronization for adjusting timing of the second user-created code; and replacing the third synchronization module with a fourth synchronization module in response to the user input, wherein the fourth synchronization module also provides the standard interface for interacting with other code, and wherein the second user-created code does not require modification in response to said replacing the third synchronization module with the fourth synchronization module.

3. The method of claim 1, wherein said replacing is performed automatically in response to the user input.

4. The method of claim 1, wherein the first program comprises a graphical program, the graphical program comprising a plurality of interconnected nodes that visually indicates the functionality of the graphical program.

5. The method of claim 1, wherein the first user-created code utilizes a plurality of custom triggers, wherein each custom trigger is invoked or received using the second synchronization module.

6. The method of claim 1,
wherein the first synchronization module is configured to use a first trigger to perform the first type of synchronization; and
wherein the second synchronization module is configured to use a second trigger to perform the second type of synchronization.

7. The method of claim 1, further comprising:
receiving user input selecting the first synchronization module from a library of synchronization modules.

8. The method of claim 1, further comprising:
receiving user input specifying the first synchronization module and the first user-created code.

9. The method of claim 1, wherein said receiving user input specifying use of a second type of synchronization is performed by one or more of:
a graphical user interface (GUI); or
a wizard.

10. A non-transitory, computer accessible memory medium storing program instructions for modifying a program for a target system, wherein the target system comprises a first programmable hardware element (PHE), wherein the program instructions are executable to:
display a first program for implementation on the first PHE, wherein the first program comprises:
1) a first synchronization module having code for implementation on the first PHE, wherein the first synchronization module provides a standard interface for interacting with other code; and
2) first user-created code which performs a first function;
wherein the first synchronization module is configured to synchronize timing of the first user-created code in the first program according to a first type of synchronization;
receive user input specifying use of a second type of synchronization to synchronize the first user-created code;
replace the first synchronization module with the second synchronization module in response to the user input, wherein the second synchronization module is configured to adjust timing of the first user-created code in the first program according to the second type of synchronization, wherein the second synchronization module provides the standard interface for interacting with other code, and wherein the first user-created code does not require modification in response to said replacing the first synchronization module;
generate a hardware description for the first PHE based on the second synchronization module and the first user-created code; and
configure the first PHE according to the hardware description, wherein during operation, the first PHE is configured to adjust timing of the first user-created code according to the second synchronization module.

11. The non-transitory, computer accessible memory medium of claim 10, wherein the target system comprises a second PHE, wherein the program instructions are further executable to:
display a second program for implementation on the second PHE, wherein the second program comprises:
1) a third synchronization module having code for implementation on the second PHE, wherein the third synchronization module provides the standard interface for interacting with other code; and
2) second user-created code which performs a second function;
wherein the third synchronization module is configured to synchronize timing of the second user-created code in the second program with the first user-created code in the first program according to the first type of synchronization;
receive user input specifying use of the second type of synchronization; and
replace the third synchronization module with a fourth synchronization module in response to the user input, wherein the fourth synchronization module also provides the standard interface for interacting with other code, and wherein the second user-created code does not require modification in response to said receiving user input replacing the third synchronization module with the fourth synchronization module.

12. The non-transitory, computer accessible memory medium of claim 10, wherein the target system comprises a second PHE, wherein the program instructions are further executable to:
display a second program for implementation on the second PHE, wherein the second program comprises:
1) a third synchronization module having code for implementation on the second PHE, wherein the third synchronization module provides the standard interface for interacting with other code; and
2) second user-created code which performs a second function;
wherein the third synchronization module is configured to synchronize timing of the second user-created code in the second program with the first user-created code in the first program using the first type of synchronization;
in response to receiving user input to replace the first synchronization module with the second synchronization module, automatically replace the third synchronization module with a fourth synchronization module, wherein the fourth synchronization module is configured to synchronize timing of the second user-created code in the second program with the first user-created code in the first program using the second type of synchronization, wherein the fourth synchronization module also provides the standard interface for interacting with other code, and wherein the second user-created code does not require modification in response to said replacing the third synchronization module with the fourth synchronization module.

13. The non-transitory, computer accessible memory medium of claim 10, wherein said replacing is performed automatically in response to the user input.

14. The non-transitory, computer accessible memory medium of claim 10, wherein the first program comprises a graphical program, the graphical program comprising a plurality of interconnected nodes that visually indicates the functionality of the graphical program.

15. The non-transitory, computer accessible memory medium of claim 10, wherein the first user-created code utilizes a plurality of custom triggers, wherein each custom trigger is invoked or received using the first synchronization module.

16. The non-transitory, computer accessible memory medium of claim 10,
wherein the first synchronization module is configured to use a first trigger to perform the first type of synchronization; and
wherein the second synchronization module is configured to use a second trigger to perform the second type of synchronization.

17. The non-transitory, computer accessible memory medium of claim 10, wherein the program instructions are further executable to:
- receive user input selecting the first synchronization module from a library of synchronization modules;
- wherein said receiving user input specifying use of a second type of synchronization to synchronize the first user-created code comprises receiving user input selecting the second synchronization module from the library of synchronization modules.

\* \* \* \* \*